United States Patent
Ibarz Gabardos et al.

(10) Patent No.: US 9,630,318 B2
(45) Date of Patent: Apr. 25, 2017

(54) FEATURE DETECTION APPARATUS AND METHODS FOR TRAINING OF ROBOTIC NAVIGATION

(71) Applicant: Brain Corporation, San Diego, CA (US)

(72) Inventors: Borja Ibarz Gabardos, La Jolla, CA (US); Andrew Smith, San Diego, CA (US); Peter O'Connor, San Diego, CA (US)

(73) Assignee: Brain Corporation, San Diego, CA (US)

(*) Notice: Subject to any disclaimer, the term of this patent is extended or adjusted under 35 U.S.C. 154(b) by 0 days.

(21) Appl. No.: 14/542,391

(22) Filed: Nov. 14, 2014

(65) Prior Publication Data

US 2016/0096270 A1    Apr. 7, 2016

Related U.S. Application Data

(60) Provisional application No. 62/059,039, filed on Oct. 2, 2014.

(51) Int. Cl.
*B25J 9/16*    (2006.01)
*G05D 1/00*    (2006.01)
(Continued)

(52) U.S. Cl.
CPC ............ *B25J 9/163* (2013.01); *B25J 9/1607* (2013.01); *B25J 9/1666* (2013.01); *B25J 9/1697* (2013.01);
(Continued)

(58) Field of Classification Search
CPC ........... G06K 9/00335; G06K 9/00805; G06K 9/3241; G06K 9/52; G05B 2219/40393; G05D 1/0088; G06N 3/008; G06N 99/005
See application file for complete search history.

(56) References Cited

U.S. PATENT DOCUMENTS 3,920,972 A    11/1975    Corwin, Jr. et al.
4,468,617 A    8/1984    Ringwall
(Continued)

FOREIGN PATENT DOCUMENTS

CN    102226740 A    10/2011
EP    2384863 A2    11/2011
(Continued)

OTHER PUBLICATIONS

Abbot L. F. and Nelson S.B. (2000), "Synaptic plasticity: taming the beast", Nature Neuroscience, 3, 1178-1183.
(Continued)

*Primary Examiner* — Khoi Tran
*Assistant Examiner* — Ryan Rink
(74) *Attorney, Agent, or Firm* — Gazdzinski & Associates, PC

(57) ABSTRACT

A robotic device may be operated by a learning controller comprising a feature learning configured to determine control signal based on sensory input. An input may be analyzed in order to determine occurrence of one or more features. Features in the input may be associated with the control signal during online supervised training. During training, learning process may be adapted based on training input and the predicted output. A combination of the predicted and the target output may be provided to a robotic device to execute a task. Feature determination may comprise online adaptation of input, sparse encoding transformations. Computations related to learning process adaptation and feature detection may be performed on board by the robotic device in real time thereby enabling autonomous navigation by trained robots.

19 Claims, 14 Drawing Sheets

(51) Int. Cl.
   *G05D 1/02* (2006.01)
   *G06N 3/00* (2006.01)
(52) U.S. Cl.
   CPC ......... *G05D 1/0088* (2013.01); *G05D 1/0246* (2013.01); *G06N 3/00* (2013.01); *G05D 2201/02* (2013.01); *Y10S 901/01* (2013.01); *Y10S 901/03* (2013.01); *Y10S 901/09* (2013.01); *Y10S 901/47* (2013.01)

(56) References Cited

U.S. PATENT DOCUMENTS

| | | |
|---|---|---|
| 4,617,502 A | 10/1986 | Sakaue et al. |
| 4,638,445 A | 1/1987 | Mattaboni |
| 4,706,204 A | 11/1987 | Hattori |
| 4,763,276 A | 8/1988 | Perreirra et al. |
| 4,852,018 A | 7/1989 | Grossberg et al. |
| 5,063,603 A | 11/1991 | Burt |
| 5,092,343 A | 3/1992 | Spitzer et al. |
| 5,121,497 A | 6/1992 | Kerr et al. |
| 5,245,672 A | 9/1993 | Wilson et al. |
| 5,303,384 A | 4/1994 | Rodriguez et al. |
| 5,355,435 A | 10/1994 | Deyong et al. |
| 5,388,186 A | 2/1995 | Bose |
| 5,408,588 A | 4/1995 | Ulug |
| 5,467,428 A | 11/1995 | Ulug |
| 5,579,440 A | 11/1996 | Brown |
| 5,602,761 A | 2/1997 | Spoerre et al. |
| 5,612,883 A | 3/1997 | Shaffer et al. |
| 5,638,359 A | 6/1997 | Peltola et al. |
| 5,673,367 A | 9/1997 | Buckley |
| 5,687,294 A | 11/1997 | Jeong |
| 5,719,480 A | 2/1998 | Bock et al. |
| 5,739,811 A | 4/1998 | Rosenberg et al. |
| 5,841,959 A | 11/1998 | Guiremand |
| 5,875,108 A | 2/1999 | Hoffberg et al. |
| 5,994,864 A | 11/1999 | Inoue et al. |
| 6,009,418 A | 12/1999 | Cooper |
| 6,014,653 A | 1/2000 | Thaler |
| 6,169,981 B1 | 1/2001 | Werbos |
| 6,218,802 B1 | 4/2001 | Onoue et al. |
| 6,259,988 B1 | 7/2001 | Galkowski et al. |
| 6,272,479 B1 | 8/2001 | Farry et al. |
| 6,363,369 B1 | 3/2002 | Liaw et al. |
| 6,366,293 B1 | 4/2002 | Hamilton et al. |
| 6,442,451 B1 | 8/2002 | Lapham |
| 6,458,157 B1 | 10/2002 | Suaning |
| 6,489,741 B1 | 12/2002 | Genov et al. |
| 6,493,686 B1 | 12/2002 | Francone et al. |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,581,046 B1 | 6/2003 | Ahissar |
| 6,601,049 B1 | 7/2003 | Cooper |
| 6,636,781 B1 | 10/2003 | Shen et al. |
| 6,643,627 B2 | 11/2003 | Liaw et al. |
| 6,697,711 B2 | 2/2004 | Yokono et al. |
| 6,703,550 B2 | 3/2004 | Chu |
| 6,760,645 B2 | 7/2004 | Kaplan et al. |
| 6,961,060 B1 | 11/2005 | Mochizuki et al. |
| 7,002,585 B1 | 2/2006 | Watanabe et al. |
| 7,024,276 B2 | 4/2006 | Ito |
| 7,243,334 B1 | 7/2007 | Berger et al. |
| 7,324,870 B2 | 1/2008 | Lee |
| 7,342,589 B2 | 3/2008 | Miserocchi |
| 7,395,251 B2 | 7/2008 | Linsker |
| 7,398,259 B2 | 7/2008 | Nugent |
| 7,426,501 B2 | 9/2008 | Nugent |
| 7,426,920 B1 | 9/2008 | Petersen |
| 7,668,605 B2 | 2/2010 | Braun et al. |
| 7,672,920 B2 | 3/2010 | Ito et al. |
| 7,752,544 B2 | 7/2010 | Cheng et al. |
| 7,849,030 B2 | 12/2010 | Ellingsworth |
| 8,015,130 B2 | 9/2011 | Matsugu et al. |
| 8,145,355 B2 | 3/2012 | Danko |
| 8,214,062 B2 | 7/2012 | Eguchi et al. |
| 8,271,134 B2 | 9/2012 | Kato et al. |
| 8,315,305 B2 | 11/2012 | Petre et al. |
| 8,364,314 B2 | 1/2013 | Abdallah et al. |
| 8,380,652 B1 | 2/2013 | Francis, Jr. |
| 8,419,804 B2 | 4/2013 | Herr et al. |
| 8,452,448 B2 | 5/2013 | Pack et al. |
| 8,467,623 B2 | 6/2013 | Izhikevich et al. |
| 8,509,951 B2 | 8/2013 | Gienger |
| 8,571,706 B2 | 10/2013 | Zhang et al. |
| 8,639,644 B1 | 1/2014 | Hickman et al. |
| 8,655,815 B2 | 2/2014 | Palmer et al. |
| 8,751,042 B2 | 6/2014 | Lee et al. |
| 8,793,205 B1 | 7/2014 | Fisher et al. |
| 8,924,021 B2 | 12/2014 | Dariush et al. |
| 8,958,912 B2 | 2/2015 | Blumberg et al. |
| 8,972,315 B2 | 3/2015 | Szatmary et al. |
| 8,990,133 B1 | 3/2015 | Ponulak et al. |
| 9,008,840 B1 | 4/2015 | Ponulak et al. |
| 9,015,092 B2 | 4/2015 | Sinyavskiy et al. |
| 9,015,093 B1 | 4/2015 | Commons |
| 9,047,568 B1 | 6/2015 | Fisher et al. |
| 9,056,396 B1 | 6/2015 | Linnell |
| 9,070,039 B2 | 6/2015 | Richert |
| 9,082,079 B1 | 7/2015 | Coenen |
| 9,104,186 B2 | 8/2015 | Sinyavskiy et al. |
| 9,144,907 B2 | 9/2015 | Summer et al. |
| 9,177,245 B2 | 11/2015 | Richert et al. |
| 9,186,793 B1 | 11/2015 | Meier |
| 9,189,730 B1 | 11/2015 | Coenen et al. |
| 9,193,075 B1 | 11/2015 | Cipollini et al. |
| 9,195,934 B1 | 11/2015 | Hunt et al. |
| 9,213,937 B2 | 12/2015 | Ponulak |
| 9,242,372 B2 | 1/2016 | Laurent et al. |
| 2001/0045809 A1 | 11/2001 | Mukai |
| 2002/0038294 A1 | 3/2002 | Matsugu |
| 2002/0103576 A1 | 8/2002 | Takamura et al. |
| 2002/0158599 A1 | 10/2002 | Fujita et al. |
| 2002/0169733 A1 | 11/2002 | Peters et al. |
| 2002/0175894 A1 | 11/2002 | Grillo |
| 2002/0198854 A1 | 12/2002 | Berenji et al. |
| 2003/0023347 A1 | 1/2003 | Konno et al. |
| 2003/0050903 A1 | 3/2003 | Liaw et al. |
| 2003/0108415 A1 | 6/2003 | Hosek et al. |
| 2003/0144764 A1 | 7/2003 | Yokono et al. |
| 2003/0220714 A1 | 11/2003 | Nakamura et al. |
| 2004/0030449 A1 | 2/2004 | Solomon |
| 2004/0036437 A1 | 2/2004 | Ito |
| 2004/0051493 A1 | 3/2004 | Furuta et al. |
| 2004/0128028 A1 | 7/2004 | Miyamoto et al. |
| 2004/0131998 A1 | 7/2004 | Marom et al. |
| 2004/0136439 A1 | 7/2004 | Dewberry et al. |
| 2004/0158358 A1 | 8/2004 | Anezaki et al. |
| 2004/0162638 A1 | 8/2004 | Solomon |
| 2004/0167641 A1 | 8/2004 | Kawai et al. |
| 2004/0172168 A1 | 9/2004 | Watanabe et al. |
| 2004/0193670 A1 | 9/2004 | Langan et al. |
| 2004/0267404 A1 | 12/2004 | Danko |
| 2005/0004710 A1 | 1/2005 | Shimomura et al. |
| 2005/0008227 A1* | 1/2005 | Duan ................... G06K 9/6282 382/195 |
| 2005/0015351 A1 | 1/2005 | Nugent |
| 2005/0036649 A1 | 2/2005 | Yokono et al. |
| 2005/0049749 A1 | 3/2005 | Watanabe et al. |
| 2005/0065651 A1 | 3/2005 | Ayers et al. |
| 2005/0069207 A1 | 3/2005 | Zakrzewski et al. |
| 2005/0113973 A1 | 5/2005 | Endo et al. |
| 2005/0119791 A1 | 6/2005 | Nagashima |
| 2005/0125099 A1 | 6/2005 | Mikami et al. |
| 2005/0283450 A1 | 12/2005 | Matsugu et al. |
| 2006/0069448 A1 | 3/2006 | Yasui |
| 2006/0082340 A1 | 4/2006 | Watanabe et al. |
| 2006/0094001 A1 | 5/2006 | Torre et al. |
| 2006/0129277 A1 | 6/2006 | Wu et al. |
| 2006/0129506 A1 | 6/2006 | Edelman et al. |
| 2006/0149489 A1 | 7/2006 | Joublin et al. |
| 2006/0161218 A1 | 7/2006 | Danilov |
| 2006/0161300 A1 | 7/2006 | Gonzalez-Banos et al. |
| 2006/0167530 A1 | 7/2006 | Flaherty et al. |

(56) References Cited

U.S. PATENT DOCUMENTS

| | | |
|---|---|---|
| 2006/0181236 A1 | 8/2006 | Brogardh et al. |
| 2006/0189900 A1 | 8/2006 | Flaherty et al. |
| 2006/0207419 A1 | 9/2006 | Okazaki et al. |
| 2006/0230140 A1 | 10/2006 | Aoyama et al. |
| 2006/0250101 A1 | 11/2006 | Khatib et al. |
| 2007/0022068 A1 | 1/2007 | Linsker |
| 2007/0074177 A1 | 3/2007 | Kurita et al. |
| 2007/0100780 A1 | 5/2007 | Fleischer et al. |
| 2007/0112700 A1 | 5/2007 | Den Haan et al. |
| 2007/0151389 A1 | 7/2007 | Prisco et al. |
| 2007/0176643 A1 | 8/2007 | Nugent |
| 2007/0200525 A1 | 8/2007 | Kanaoka |
| 2007/0208678 A1 | 9/2007 | Matsugu |
| 2007/0250464 A1 | 10/2007 | Hamilton |
| 2007/0255454 A1 | 11/2007 | Dariush et al. |
| 2007/0260356 A1 | 11/2007 | Kock et al. |
| 2008/0024345 A1 | 1/2008 | Watson |
| 2008/0040040 A1 | 2/2008 | Goto et al. |
| 2008/0097644 A1 | 4/2008 | Kaznov et al. |
| 2008/0100482 A1 | 5/2008 | Lazar |
| 2008/0112596 A1 | 5/2008 | Rhoads et al. |
| 2008/0133052 A1 | 6/2008 | Jones et al. |
| 2008/0140257 A1 | 6/2008 | Sato et al. |
| 2008/0154428 A1 | 6/2008 | Nagatsuka et al. |
| 2008/0162391 A1 | 7/2008 | Izhikevich |
| 2008/0294074 A1 | 11/2008 | Tong et al. |
| 2008/0319929 A1 | 12/2008 | Kaplan et al. |
| 2009/0037033 A1 | 2/2009 | Phillips et al. |
| 2009/0037351 A1 | 2/2009 | Kristal et al. |
| 2009/0043722 A1 | 2/2009 | Nugent |
| 2009/0069943 A1 | 3/2009 | Akashi et al. |
| 2009/0105786 A1 | 4/2009 | Fetz et al. |
| 2009/0231359 A1* | 9/2009 | Bass, II ............... G06K 9/626 345/619 |
| 2009/0234501 A1 | 9/2009 | Ishizaki |
| 2009/0265036 A1 | 10/2009 | Jamieson et al. |
| 2009/0272585 A1 | 11/2009 | Nagasaka |
| 2009/0287624 A1 | 11/2009 | Rouat et al. |
| 2009/0299751 A1 | 12/2009 | Jung |
| 2009/0312817 A1 | 12/2009 | Hogle et al. |
| 2010/0036457 A1 | 2/2010 | Sarpeshkar et al. |
| 2010/0081958 A1 | 4/2010 | She |
| 2010/0086171 A1 | 4/2010 | Lapstun |
| 2010/0119214 A1 | 5/2010 | Shimazaki et al. |
| 2010/0152896 A1 | 6/2010 | Komatsu et al. |
| 2010/0152899 A1 | 6/2010 | Chang et al. |
| 2010/0166320 A1 | 7/2010 | Paquier |
| 2010/0169098 A1 | 7/2010 | Patch |
| 2010/0198765 A1 | 8/2010 | Fiorillo |
| 2010/0222924 A1 | 9/2010 | Gienger et al. |
| 2010/0225824 A1 | 9/2010 | Lazar et al. |
| 2010/0228264 A1 | 9/2010 | Robinson et al. |
| 2010/0286824 A1 | 11/2010 | Solomon |
| 2010/0292835 A1 | 11/2010 | Sugiura et al. |
| 2010/0299101 A1 | 11/2010 | Shimada et al. |
| 2010/0305758 A1 | 12/2010 | Nishi et al. |
| 2010/0312730 A1 | 12/2010 | Weng et al. |
| 2011/0010006 A1 | 1/2011 | Tani et al. |
| 2011/0016071 A1 | 1/2011 | Guillen et al. |
| 2011/0026770 A1 | 2/2011 | Brookshire |
| 2011/0035052 A1 | 2/2011 | McLurkin et al. |
| 2011/0035188 A1* | 2/2011 | Martinez-Heras ... G05B 23/021 702/189 |
| 2011/0040405 A1 | 2/2011 | Lim et al. |
| 2011/0060460 A1 | 3/2011 | Oga et al. |
| 2011/0060461 A1 | 3/2011 | Velliste et al. |
| 2011/0067479 A1 | 3/2011 | Davis et al. |
| 2011/0071676 A1 | 3/2011 | Sanders et al. |
| 2011/0107270 A1 | 5/2011 | Wang et al. |
| 2011/0110006 A1 | 5/2011 | Meyer et al. |
| 2011/0119214 A1 | 5/2011 | Breitwisch et al. |
| 2011/0119215 A1 | 5/2011 | Elmegreen et al. |
| 2011/0144802 A1 | 6/2011 | Jang |
| 2011/0158476 A1 | 6/2011 | Fahn et al. |
| 2011/0160741 A1 | 6/2011 | Asano et al. |
| 2011/0160906 A1 | 6/2011 | Orita et al. |
| 2011/0160907 A1 | 6/2011 | Orita |
| 2011/0196199 A1 | 8/2011 | Donhowe et al. |
| 2011/0208350 A1 | 8/2011 | Eliuk et al. |
| 2011/0218676 A1 | 9/2011 | Okazaki |
| 2011/0231016 A1 | 9/2011 | Goulding |
| 2011/0244919 A1* | 10/2011 | Aller ................. G06K 9/00973 455/556.1 |
| 2011/0282169 A1* | 11/2011 | Grudic ................ G06F 19/3437 600/324 |
| 2011/0296944 A1 | 12/2011 | Carter et al. |
| 2011/0319714 A1 | 12/2011 | Roelle et al. |
| 2012/0008838 A1* | 1/2012 | Guyon .................. G06F 19/345 382/128 |
| 2012/0011090 A1 | 1/2012 | Tang et al. |
| 2012/0011093 A1 | 1/2012 | Aparin et al. |
| 2012/0017232 A1* | 1/2012 | Hoffberg .................. G06N 7/06 725/13 |
| 2012/0036099 A1 | 2/2012 | Venkatraman et al. |
| 2012/0045068 A1 | 2/2012 | Kim et al. |
| 2012/0053728 A1 | 3/2012 | Theodorus et al. |
| 2012/0109866 A1 | 5/2012 | Modha |
| 2012/0143495 A1 | 6/2012 | Dantu |
| 2012/0144242 A1 | 6/2012 | Vichare et al. |
| 2012/0150777 A1 | 6/2012 | Setoguchi et al. |
| 2012/0150781 A1 | 6/2012 | Arthur et al. |
| 2012/0173021 A1 | 7/2012 | Tsusaka |
| 2012/0185092 A1 | 7/2012 | Ku |
| 2012/0197439 A1 | 8/2012 | Wang et al. |
| 2012/0209428 A1 | 8/2012 | Mizutani |
| 2012/0209432 A1 | 8/2012 | Fleischer et al. |
| 2012/0221147 A1 | 8/2012 | Goldberg et al. |
| 2012/0296471 A1 | 11/2012 | Inaba et al. |
| 2012/0303091 A1 | 11/2012 | Izhikevich |
| 2012/0303160 A1 | 11/2012 | Ziegler et al. |
| 2012/0308076 A1 | 12/2012 | Piekniewski et al. |
| 2012/0308136 A1 | 12/2012 | Izhikevich |
| 2013/0000480 A1 | 1/2013 | Komatsu et al. |
| 2013/0006468 A1 | 1/2013 | Koehrsen et al. |
| 2013/0019325 A1 | 1/2013 | Deisseroth et al. |
| 2013/0066468 A1 | 3/2013 | Choi et al. |
| 2013/0073080 A1 | 3/2013 | Ponulak |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073493 A1 | 3/2013 | Modha |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0096719 A1 | 4/2013 | Sanders et al. |
| 2013/0116827 A1 | 5/2013 | Inazumi |
| 2013/0151442 A1 | 6/2013 | Suh et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0172906 A1 | 7/2013 | Olson et al. |
| 2013/0173060 A1 | 7/2013 | Yoo et al. |
| 2013/0218339 A1 | 8/2013 | Maisonnier et al. |
| 2013/0218821 A1 | 8/2013 | Szatmary et al. |
| 2013/0245829 A1 | 9/2013 | Ohta et al. |
| 2013/0251278 A1 | 9/2013 | Izhikevich et al. |
| 2013/0297541 A1 | 11/2013 | Piekniewski et al. |
| 2013/0297542 A1 | 11/2013 | Piekniewski et al. |
| 2013/0310979 A1 | 11/2013 | Herr et al. |
| 2013/0325244 A1 | 12/2013 | Wang et al. |
| 2013/0325766 A1 | 12/2013 | Petre et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325776 A1 | 12/2013 | Ponulak et al. |
| 2013/0325777 A1 | 12/2013 | Petre et al. |
| 2013/0345718 A1 | 12/2013 | Crawford et al. |
| 2013/0346347 A1* | 12/2013 | Patterson ............. G06N 99/005 706/12 |
| 2014/0012788 A1 | 1/2014 | Piekniewski |
| 2014/0016858 A1 | 1/2014 | Richert |

(56) References Cited

U.S. PATENT DOCUMENTS

| | | |
|---|---|---|
| 2014/0025613 A1 | 1/2014 | Ponulak |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0081895 A1 | 3/2014 | Coenen et al. |
| 2014/0089232 A1 | 3/2014 | Buibas et al. |
| 2014/0114479 A1 | 4/2014 | Okazaki |
| 2014/0122397 A1 | 5/2014 | Richert et al. |
| 2014/0122398 A1 | 5/2014 | Richert |
| 2014/0156574 A1 | 6/2014 | Piekniewski et al. |
| 2014/0163729 A1 | 6/2014 | Shi et al. |
| 2014/0187519 A1 | 7/2014 | Cooke et al. |
| 2014/0193066 A1 | 7/2014 | Richert |
| 2014/0222739 A1 | 8/2014 | Ponulak |
| 2014/0229411 A1 | 8/2014 | Richert et al. |
| 2014/0244557 A1 | 8/2014 | Piekniewski et al. |
| 2014/0277718 A1 | 9/2014 | Izhikevich et al. |
| 2014/0277744 A1 | 9/2014 | Coenen |
| 2014/0298212 A1 | 10/2014 | Wen |
| 2014/0309659 A1 | 10/2014 | Roh et al. |
| 2014/0350723 A1 | 11/2014 | Prieto et al. |
| 2014/0358284 A1 | 12/2014 | Laurent et al. |
| 2014/0358828 A1* | 12/2014 | Phillipps ............ G06Q 30/0241 706/12 |
| 2014/0369558 A1 | 12/2014 | Holz |
| 2014/0371907 A1 | 12/2014 | Passot et al. |
| 2014/0371912 A1 | 12/2014 | Passot et al. |
| 2015/0032258 A1 | 1/2015 | Passot et al. |
| 2015/0066479 A1 | 3/2015 | Pasupalak et al. |
| 2015/0094850 A1 | 4/2015 | Passot et al. |
| 2015/0094852 A1 | 4/2015 | Laurent et al. |
| 2015/0127149 A1 | 5/2015 | Sinyavskiy et al. |
| 2015/0127154 A1 | 5/2015 | Passot et al. |
| 2015/0127155 A1 | 5/2015 | Passot et al. |
| 2015/0148956 A1 | 5/2015 | Negishi |
| 2015/0204559 A1* | 7/2015 | Hoffberg ................ G06N 7/06 700/278 |
| 2015/0283701 A1 | 10/2015 | Izhikevich et al. |
| 2015/0283702 A1 | 10/2015 | Izhikevich et al. |
| 2015/0283703 A1 | 10/2015 | Izhikevich et al. |
| 2015/0306761 A1 | 10/2015 | O'Connor et al. |
| 2015/0317357 A1* | 11/2015 | Harmsen ........... G06F 17/30424 707/723 |
| 2015/0338204 A1 | 11/2015 | Richert et al. |
| 2015/0339589 A1* | 11/2015 | Fisher ................. G06N 99/005 706/12 |
| 2015/0339826 A1 | 11/2015 | Buibas et al. |
| 2015/0341633 A1 | 11/2015 | Richert |
| 2016/0004923 A1 | 1/2016 | Piekniewski et al. |
| 2016/0014426 A1 | 1/2016 | Richert |

FOREIGN PATENT DOCUMENTS

| | | |
|---|---|---|
| JP | H0487423 A | 3/1992 |
| JP | 2003175480 A | 6/2003 |
| RU | 2108612 C1 | 4/1998 |
| WO | WO-2008083335 A2 | 7/2008 |
| WO | WO-2010136961 A1 | 12/2010 |
| WO | WO-2011039542 A1 | 4/2011 |
| WO | WO-2012151585 A2 | 11/2012 |

OTHER PUBLICATIONS

Alexandros <g class="gr_gr_3 gr-alert gr_spell ContextualSpelling ins-del multiReplace" id="3" data-gr-id="3">Bouganis</g> and Murray Shanahan, "Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Alvarez, "Review of Approximation Techniques," PhD thesis, chapter 2, pp. 7-14, University of Bradford, 2000.

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet:<a href="http://msc.berkeley.edu/wjchen/publications/DSC12.sub.--8726.sub.--FI-.pdf">http://msc.berkeley.edu/wjchen/publications/DSC12.sub.--8726.sub.--FI-.pdf</a><http: />.

Bartlett et al., "Convexity, Classification, and Risk Bounds" Jun. 16, 2005, pp. 1-61.

Bartlett., et al., "Large Margin Classifiers: Convex Loss, Low Noise, and Convergence Rates," Dec. 8, 2003, 8 pgs.

Bohte, 'Spiking Nueral Networks' Doctorate at the University of Leiden, Holland, Mar. 5, 2003, pp. 1-133 [retrieved on Nov. 14, 2012]. Retrieved from the interne <a href="http://homepages.cwi.nl/~sbohte/publication/phdthesis.pdf">http://homepages.cwi.nl/~sbohte/publication/phdthesis.pdf</a><url: />.

Branca, et al. (1995), A Neural Network of Ego-motion Estimation from Optical Flow BMC'95 Proceedings of the 1995 British conference on machine vision (vol. 1), pp. 247-256.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Chung Hyuk Park., et al., Transfer of Skills between Human Operators through Haptic Training with Robot Coordination. International Conference on Robotics and Automation Anchorage Convention District, Anchorage, Alaska, USA, pp. 229-235 [online], 2010 [retrieved Dec. 3, 2015]. Retrieved from the Internet:<URL:https://smartech.gatech.edu!bitstream/handle/1853/38279/IEEE_2010_ICRA_002.pdf>.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org />.

Gewaltig et al.. 'NEST (Neural Simulation Tool)', Scholarpedia, 2007. pp. I-15. 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gollisch et al., 'Rapid neural coding in the retina with relative spike latencies.' Science 319.5866 (2008): 1108-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

(56) References Cited

OTHER PUBLICATIONS

Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002, pp. 1-128.
Graham The Surf Hippo User Manual Version 3.0 B". Unite de Neurosciences Integratives et Computationnelles Institut Federatif de Neurobiologie Alfred Fessard CNRS. France. Mar. 2002 [retrieved Jan. 16, 2014]. [retrieved biomedical.univ-paris5.fr]".
Grollman., et al., "Dogged Learning for Robots," IEEE International Conference on Robotics and Automation (ICRA), 2007.
Hatsopoulos, Visual Navigation with a Neural Network, Published 1991.
http://www.braincorporation.com/specs/13StemSpecSheet_Rev_Nov11_2013.pdf.
Huang, Fall Detection Using Modular Neural Networks with Back-projected Optical Flow, Published 2007.
Izhikevich E.M. (2006) Polychronization: Computation With Spikes. Neural Computation, 18:245-282.
Izhikevich et al., 'Relating STDP to BCM', Neural Computation (2003) 15, 1511-1523.
Izhikevich, 'Simple Model of Spiking Neurons', IEEE Transactions on Neural Networks, vol. 14, No. 6, Nov. 2003, pp. 1569-1572.
Jin, X., Rast, A., F. Galluppi, F., S. Davies., S., and Furber, S. (2010) "Implementing Spike-Timing-Dependent Plasticity on SpiNNaker Neuromorphic Hardware", WCCI 2010, IEEE World Congress on Computational Intelligence.
Kalman Filter; wikipedia.
Karbowski et al., 'Multispikes and Synchronization in a Large Neural Network with Temporal Delays', Neural Computation 12. 1573-1606 (2000).
Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from the Internet: <a href="http://ncs.ethz.ch/projects/evospike/publications/evolving-spiking-neural-networks-for-spatio-and-spectro-temporal-pattern-recognition-plenary-talk-ieee-is/view">http://ncs.ethz.ch/projects/evospike/publications/evolving-spiking-neural-networks-for-spatio-and-spectro-temporal-pattern-recognition-plenary-talk-ieee-is/view</a>.
Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf.
Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.
Laurent, 'The Neural Network Query Language (NNQL) Reference' [retrieved on Nov. 12, 2013]Retrieved from the Internet: <URL'https://code.google.com/p/ nnql/issues/detail?id=1>.
Lazar et a]. 'Multichannel time encoding with integrate-and-fire neurons.' Neurocomputing 65 (2005): 401-407.
Lazar et al. 'A video time encoding machine', in Proceedings of the 15th IEEE International Conference on Image Processing (ICIP '08 2008, pp. 717-720.
Lazar., et al., "Consistent recovery of sensory stimuli encoded with MIMO neural circuits," Computational intelligence and neuroscience, 2009.
Lazar et al. 'Consistent recovery of sensory stimuli encoded with MIMO neural circuits.' Computational intelligence and neuroscience (2010): 2.
Makridakis et al., "Evaluating Accuracy (or Error) Measures", INSEAD Technical Report, 1995/18/TM.
Masquelier, Timothee, 'Relative spike time coding and STOP-based orientation selectivity in the early visual system in natural continuous and saccadic vision: a computational model.' Journal of computational neuroscience 32.3 (2012): 425-441.

Miller III, "Real-Time Application of Neural Networks for Sensor-Based Control of Robots with Vision," IEEE Transactions on Systems, Man, and Cypernetics Jul./Aug. 1989, vol. 19 (4), pp. 825-831.
Nguyen et al., "Estimating divergence functionals and the likelihood ratio by penalized convex risk minimization" 2007, pp. 1-8.
Nichols, A Reconfigurable Computing Architecture for Implementing Artificial Neural Networks on FPGA, Master's Thesis, The University of Guelph, 2003, pp. 1-235.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu!viewdoc/download?doi=0.1.1.5.4346&rep—repl&type-pdf.
Sato et al., 'Pulse interval and width modulation for video transmission.' Cable Television, IEEE Transactions on 4 (1978): 165-173.
Schemmel, J., et al., Implementing synaptic plasticity in a VLSI spiking neural network model. In: Proceedings of the 20061nternational Joint Conference on Neural Networks (IJCNN'06), IEEE Press (2006) Jul. 16-21, 2006, pp. 1-6 [online], [retrieved on Aug. 24, 2012]. Retrieved from the Internet <url:> Introduction</url:>.
Simulink.RTM. model [online], [Retrieved on Dec. 10, 2013] Retrieved from <:URL:http://www.mathworks.com/ products/simulink/index.html>.
Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Specification, figures and EFS receipt of U.S. Appl. No. 14/244,888, filed Apr. 3, 2014 and entitled "Learning apparatus and methods for control of robotic devices via spoofing" (100 pages).
Specification, figures and EFS receipt of U.S. Appl. No. 14/244,890, filed Apr. 3, 2014 and entitled "Apparatus and methods for remotely controlling robotic devices" (91 pages).
Specification, figures and EFS receipt of U.S. Appl. No. 14/244,892, filed Apr. 3, 2014 and entitled "Spoofing remote control apparatus and methods" (95 pages).
Specification, figures and EFS receipt of U.S. Appl. No. 14/265,113, filed Apr. 29, 2014 and entitled "Trainable convolutional network apparatus and methods for operating a robotic vehicle" (71 pages).
Specification, figures and EFS receipt of U.S. Appl. No. 14/285,385, filed May 22, 2014 and entitled "Apparatus and methods for real time estimation of differential motion in live video" (42 pages).
Specification, figures and EFS receipt of U.S. Appl. No. 14/285,414, filed May 22, 2014 and entitled "Apparatus and methods for distance estimation using multiple image sensors" (63 pages).
Specification, figures and EFS receipt of U.S. Appl. No. 14/285,466, filed May 22, 2014 and entitled "Apparatus and methods for robotic operation using video imagery" (64 pages).
Specification, figures and EFS receipt of U.S. Appl. No. 14/321,736, filed Jul. 1, 2014 and entitled "Optical detection apparatus and methods" (49 pages).
Specification, figures and EFS receipt of U.S. Appl. No. 14/326,374, filed Jul. 8, 2014 and entitled "Apparatus and methods for distance estimation using stereo imagery" (75 pages).
Specification, figures and EFS receipt of U.S. Appl. No. 14/489,242, filed Sep. 17, 2014 and entitled "Apparatus and methods for remotely controlling robotic devices" (100 pages).
Specification, figures and EFS receipt of U.S. Appl. No. 14/542,391, filed Nov. 14, 2014 and entitled "Feature detection apparatus and methods for training of robotic navigation" (83 pages).

(56) References Cited

OTHER PUBLICATIONS

Specification, figures and EFS receipt of U.S. Appl. No. 14/588,168, filed Dec. 31, 2014 and entitled—Apparatus and methods for training robots (101 pages).
Specification, figures and EFS receipt of U.S. Appl. No. 14/637,138, filed Mar. 3, 2015 and entitled "Salient features tracking apparatus and methods using visual initialization" (66 pages).
Specification, figures and EFS receipt of U.S. Appl. No. 14/637,164, filed Mar. 3, 2015 and entitled "Apparatus and methods for tracking salient features" (66 pages).
Specification, figures and EFS receipt of U.S. Appl. No. 14/637,191, filed Mar. 3, 2015 and entitled "Apparatus and methods for saliency detection based on color occurrence analysis" (66 pages).
Specification, figures and EFS receipt of U.S. Appl. No. 14/705,487, filed May 6, 2015 and entitled—Persistent predictor apparatus and methods for task switching (119 pages).
Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi% 2F10.1371 %2Fjournal,pcbi.1000879<url:></url:>.
Walters, "Implementation of Self-Organizing Neural Networks for Visuo-Motor Control of an Industrial Robot," IEEE Transactions on Neural Networks, vol. 4 (1), Jan. 1993, pp. 86-95.
Wang 'The time dimension for scene analysis.' Neural Networks, IEEE Transactions on 16.6 (2005): 1401-1426.
Zhou, Computation of Optical Flow Usinga Neural Network, Published 1988.

\* cited by examiner

FEATURE DETECTION APPARATUS AND METHODS FOR TRAINING OF ROBOTIC NAVIGATION

PRIORITY AND CROSS-REFERENCE TO RELATED APPLICATIONS

This application claims priority to U.S. Provisional Patent Application Ser. No. 62/059,039 entitled "APPARATUS AND METHODS FOR TRAINING OF ROBOTS", filed on Oct. 2, 2014, which is incorporated herein by reference in its entirety.

This application is related to co-pending and co-owned U.S. patent application Ser. Nos. 14/265,113 entitled "TRAINABLE CONVOLUTIONAL NETWORK APPARATUS AND METHODS FOR OPERATING A ROBOTIC VEHICLE", filed Apr. 29, 2014, Ser. No. 14/244,890 entitled "APPARATUS AND METHODS FOR REMOTELY CONTROLLING ROBOTIC DEVICES", filed Apr. 3, 2014, Ser. No. 13/918,338 entitled "ROBOTIC TRAINING APPARATUS AND METHODS", filed Jun. 14, 2013, Ser. No. 13/918,298 entitled "HIERARCHICAL ROBOTIC CONTROLLER APPARATUS AND METHODS", filed Jun. 14, 2013, Ser. No. 13/907,734 entitled "ADAPTIVE ROBOTIC INTERFACE APPARATUS AND METHODS", filed May 31, 2013, Ser. No. 13/842,530 entitled "ADAPTIVE PREDICTOR APPARATUS AND METHODS", filed Mar. 15, 2013, Ser. No. 13/842,562 entitled "ADAPTIVE PREDICTOR APPARATUS AND METHODS FOR ROBOTIC CONTROL", filed Mar. 15, 2013, Ser. No. 13/842,616 entitled "ROBOTIC APPARATUS AND METHODS FOR DEVELOPING A HIERARCHY OF MOTOR PRIMITIVES", filed Mar. 15, 2013, Ser. No. 13/842,647 entitled "MULTICHANNEL ROBOTIC CONTROLLER APPARATUS AND METHODS", filed Mar. 15, 2013, and Ser. No. 13/842,583 entitled "APPARATUS AND METHODS FOR TRAINING OF ROBOTIC DEVICES", filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to, inter alia, adaptive control and training of robotic devices.

Background

Robotic devices are used in a variety of applications, such as manufacturing, medical, safety, military, exploration, and/or other applications. Some existing robotic devices (e.g., manufacturing assembly and/or packaging) may be programmed in order to perform desired functionality. Some robotic devices (e.g., surgical robots) may be remotely controlled by humans, while some robots (e.g., iRobot Roomba®) may learn to operate via exploration.

Remote control robotic devices may require user attention during the duration of task execution by the robot. Remote control operation typically relies on user experience and/or agility that may be inadequate when dynamics of the control system and/or environment change rapidly (e.g., an unexpected obstacle appears in path of a remotely controlled vehicle).

SUMMARY

One aspect of the disclosure relates to a method of operating a robotic device by a computerized neuron network comprising an input layer, an intermediate layer and an output layer of neurons. In one embodiment, the method includes: during one operation of a plurality of operations causing the robotic device to execute an action along a first trajectory in accordance with a first control signal determined based on a sensory input; determining, by the output layer, a performance measure based on an evaluation of the first trajectory and indication related to a target trajectory provided by a trainer; conveying information related to the performance measure to the input layer; and updating one or more learning parameters of the input layer in accordance with the information. In one embodiment, during a subsequent operation of a plurality of operations: causing the robotic device to execute the action along a second trajectory in accordance with a second control signal determined based on the sensory input; wherein: the execution of the action along the second trajectory is characterized by a second performance measure; and the updating is configured to displace the second trajectory closer towards the target trajectory relative to the first trajectory.

In another aspect, a method of operating a robotic device by a learning controller is disclosed. In one embodiment, the method includes: during an operation of a plurality of operations: causing the robotic device to execute an action along a first trajectory in accordance with a first control signal determined based on a sensory input; determining, a performance measure based on an evaluation of the first trajectory and an indication related to a target trajectory provided by a trainer; conveying information related to the performance measure to the learning controller; and updating one or more learning parameters of the learning controller in accordance with the information. In one such embodiment, during a subsequent operation of the plurality of operations, the method includes: causing the robotic device to execute the action along a second trajectory in accordance with a second control signal determined based on the sensory input; wherein: the execution of the action along the second trajectory is characterized by a second performance measure; and the updating is configured to displace the second trajectory closer towards the target trajectory relative to the first trajectory.

In one such variant, the first control signal is based on a plurality of features being detected in the sensory input by a feature detection component comprising a first plurality of spiking neuron nodes; and the updating is configured to modify one or more parameters associated with one or more first nodes of the first plurality of spiking neuron nodes. In one such case, the first control signal is determined by one or more second nodes of a second plurality of spiking neuron nodes; the one or more first nodes of the first plurality of nodes are coupled to the one or more second nodes of the second plurality of nodes via a connectivity array of efficacies; and the updating comprises a plasticity operation configured to modify one or more efficacies of the connectivity array of efficacies. In another variant, individual first ones of the first plurality of nodes are coupled to individual second ones of the second plurality of nodes via an all-to-all connectivity pattern; and the connectivity array of efficacies is characterized by a first dimension determined based on a first number of the one or more first nodes of the first plurality of nodes and a second dimension determined based on a second number of the one or more second nodes of the second plurality of nodes.

In one variant, the performance measure comprises a first distance between the first trajectory and the target trajectory; and the second performance measure comprises a second distance between the second trajectory and the target trajectory, the second distance being smaller than the first distance.

In another variant, the performance measure comprises a first probability parameter between the first trajectory and the target trajectory; and the second performance measure comprises a second probability parameter between the second trajectory and the target trajectory, the second probability parameter being greater than the first probability.

In still another variant, the learning controller is configured for operation in accordance with a supervised learning process configured based on a teaching signal; and the first control signal comprises a combination of the second layer output and a teaching signal provided to the robotic device.

In other implementations, the operation and the another operation occur at a part of an online learning process wherein within a given time period, the robot may receive a teaching input, modify the learning process based on the teaching input and the learning process configuration, and subsequently navigate the trajectory based on the modified learning process.

In another aspect, a method of determining a motor signal for a robot based on analysis of sensor input is disclosed. In one embodiment, the method includes: analyzing the sensor input using a first transformation process configured by one or more first features present in the sensor input using a first characteristic; analyzing the sensor input using a second transformation process configured by one or more second features present in the sensor input using a second characteristic, the second characteristic being different from the first characteristic; determining a feature history comprising a plurality of features determined based on analysis of the sensor input over a time interval; normalizing individual ones of the plurality of features using a statistical parameter determined from the feature history; providing a plurality of normalized features to a classification process configured to detect at least one relevant feature among the plurality of normalized features, the relevant feature being characterized by a greater relevancy parameter compared to other ones of the plurality of normalized features; and selecting from a plurality of control signals the motor control signal associated with the relevant feature; wherein the selection of the motor control signal is effectuated based on prior contemporaneous occurrence of the motor control signal and the relevant feature.

In one variant, the relevance parameter comprises one or more of a correlation, a probability, and a distance measure between an occurrence of the individual ones of the plurality of features and an occurrence of the motor signal. In one such case, the first characteristic is selected from a group consisting of feature color, feature texture, feature edge orientation, and feature type; and the second characteristic is configured to characterize a feature motion.

In another variant, the first transformation process comprises a sparsification operation comprising selecting one or more first features from a plurality of first outputs produced by the first transformation based on the first characteristic; and the sparsification operation configured to reduce number of data elements by a factor of at least four. In one such case, the first characteristic comprises a statistical parameter determined based on a plurality of outputs of the transformation.

In another aspect, a self-contained robotic apparatus is disclosed. In one such embodiment, the apparatus includes: a platform comprising a motor; a sensor component configured to obtain a plurality of video frames at a frame rate; one or more processors configured to operate: a feature detection logic configured to detect a plurality of features based on analysis of the plurality of video frames; and a learning controller logic configured to produce a control indication based on the plurality of features and a performance indication; an adapter component configured to produce a motor activation signal based on the control indication; and an enclosure configured to house the motor, the sensor component, the adaptor component, and the one or more processors. In one such embodiment, the motor activation signal is configured to cause the self-contained robotic apparatus to execute an action characterized by an outcome; the one or more processors is characterized by a processing capacity being sufficient for operate the feature detection and the learning component logic so that for a given frame of the plurality of frames, the control indication is being produced based on one or more features corresponding to the given frame prior to occurrence of a subsequent frame of the plurality of video frames; the feature detection is configured based on application of a plurality of spatial filter operations to individual frames of the plurality of video frames; and the performance indication is configured based on the outcome and a target outcome.

In one such variant, the apparatus includes a communications interface configured to receive an external input indicative of the target outcome. In another variant, the control indication for the given frame of the plurality of frames is configured based on another previously determined control indication produced based on a preceding frame relative to the given frame and the external input.

In another variant, the external input comprises a training control indication; the one or more processors is further configured to operate a combiner process configured to produce a combined control indication based on the control indication and the training control indication; and provision of the combined control indication is configured to cause determination of the motor activation signal.

In one variant, the combiner process is characterized by an override transfer function wherein a non-zero value of the training control indication is configured to cause determination of the combined control indication independent from the control indication.

In another variant, the combiner process is characterized by an additive transfer function wherein the combined control indication configured based on a combination of the control indication the training control indication.

In some variants, the combiner process is characterized by an listen transfer function wherein the combined control indication configured based solely on the control indication; and the learning process adaptation is configured based on the training control indication.

In still other variants the learning process comprises a nearest neighbor classifier process configured to: based on one or more features corresponding to one or more current input frames, determine a plurality of neighbors, individual ones of the plurality of neighbors comprising (i) one or more prior features determined based on one or more input frames analyzed at a prior time previously to the current input frame; and (ii) a prior control indication produced based on an evaluation of the one or more prior features at the prior time; and the control indication is configured based on a combination of individual ones of a plurality of prior control indications associated with individual ones of the plurality of neighbors.

In yet another aspect, an apparatus is disclosed. In one embodiment thereof, the apparatus is configured to determine a motor control signal for a robot based on an analysis of an input signal, and the apparatus includes: a processor; and a non-transitory computer-readable medium configured to store at least one computer program thereon, the computer program comprising a plurality of instructions configured to, when executed by the processor, cause the apparatus to: analyze the input signal based on a first transformation process applied based on a presence of at least one first feature from the input signal with a first characteristic; analyze the input signal based on a second transformation process applied based on a presence of at least one second feature from the input signal with a second characteristic, the second characteristic being different from the first characteristic; determine a plurality of features based on the analysis of the input signal based on the first transformation process over a first time interval and the analysis of the input signal based on the second transformation process over a second time interval; normalize each of the plurality of features using a statistical parameter derived from the plurality of features; provide a plurality of normalized features to a classification process configured to detect at least one relevant feature among the plurality of normalized features, the at least one relevant feature comprising a relevance parameter that exceeds a predetermined threshold; select from a plurality of control signals a motor control signal associated with the at least one relevant feature with the relevance parameter that exceeds the predetermined threshold; and apply the selected motor control to the robot, thereby causing the robot to execute a target task; wherein the selection of the motor control signal is based on a prior simultaneous occurrence of the motor control signal and the at least one relevant feature.

In yet another aspect, a system is disclosed. In embodiment thereof, the system is for determining a motor control signal for a robotic apparatus based on an analysis of an external input, and the system includes: a sensor configured to receive the external input; a non-transitory computer-readable memory configured to store a plurality of computer instructions; and at least one processing component configured to cause the plurality of computer instructions to, when executed: analyze the external input via a first transformation process applied based on a presence of a first set of features from the input signal with a first characteristic; analyze the external input via a second transformation process applied based on a presence of a second set of features from the external input with a second characteristic; determine a plurality of features based on the analysis of the external input via the first transformation process over a first period of time and the analysis of the external input via the second transformation process over a second period of time; normalize each of the plurality of features using a statistical parameter determined from the plurality of features; provide a plurality of normalized features to a classification process configured to detect one or more relevant features among the plurality of normalized features, the one or more relevant features comprising a relevance value that exceeds a threshold; and select from a plurality of control signals a motor control signal associated with the one or more relevant features with the relevance value that exceeds the threshold; wherein the selection of the motor control signal is based on a previous concurrent occurrence of the motor control signal and the one or more relevant features; and wherein the robot is configured to execute a task based on the selection of the motor control signal.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
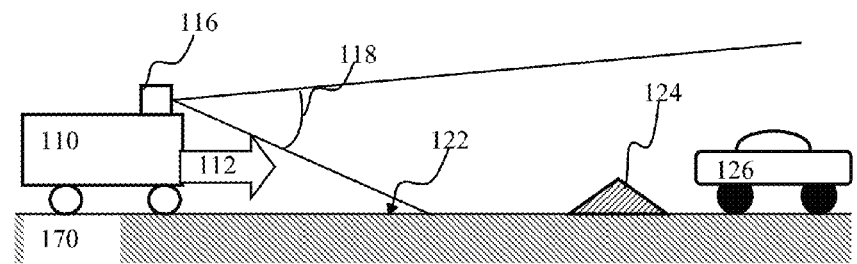
FIG. 1 is a graphical illustration depicting a robotic vehicle comprising an adaptive controller apparatus configured for obstacle avoidance, in accordance with one or more implementations.

All Figures disclosed herein are © Copyright 2014 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of, or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same components, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example, a standard "bus", hierarchical bus, network-on-chip, address-event-representation (AER) connection, and/or other type of communication topology used for accessing, e.g., different memories in a pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", and "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), programmable logic devices (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), complex instruction set computers (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2.0, USB3.0, USB3.1), Ethernet (e.g., 10/100, 10/100/1000 (Gigabit Ethernet), 10-Gig-E, etc.), MoCA, Coaxsys (e.g., TVnet™), radio frequency tuner (e.g., in-band or out-of-band (OOB), cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables (e.g., a membrane potential, firing threshold and/or other) used to describe state of a network node.

As used herein, the term "synaptic channel", "connection", "link", "transmission channel", "delay line", and "communications channel" include a link between any two or more entities (whether physical (wired or wireless), and/or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Exemplary System

Figure 4A:
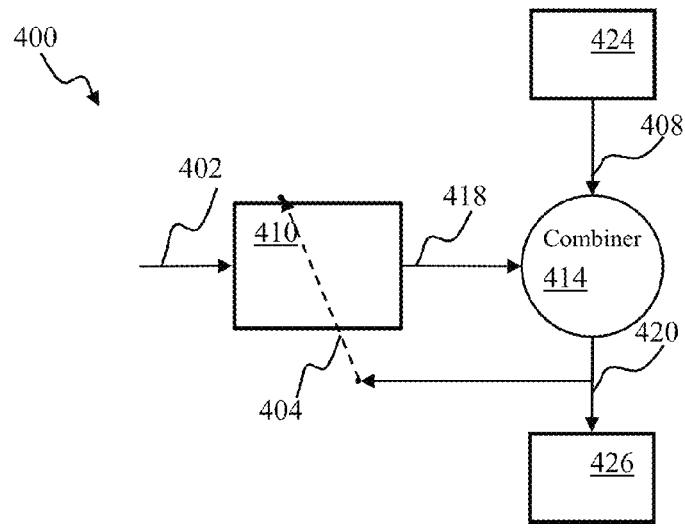
FIG. 4A is a block diagram illustrating an adaptive control system for operating, e.g., the robotic vehicle apparatus of FIG. 1, according to one or more implementations.
Figure 4B:
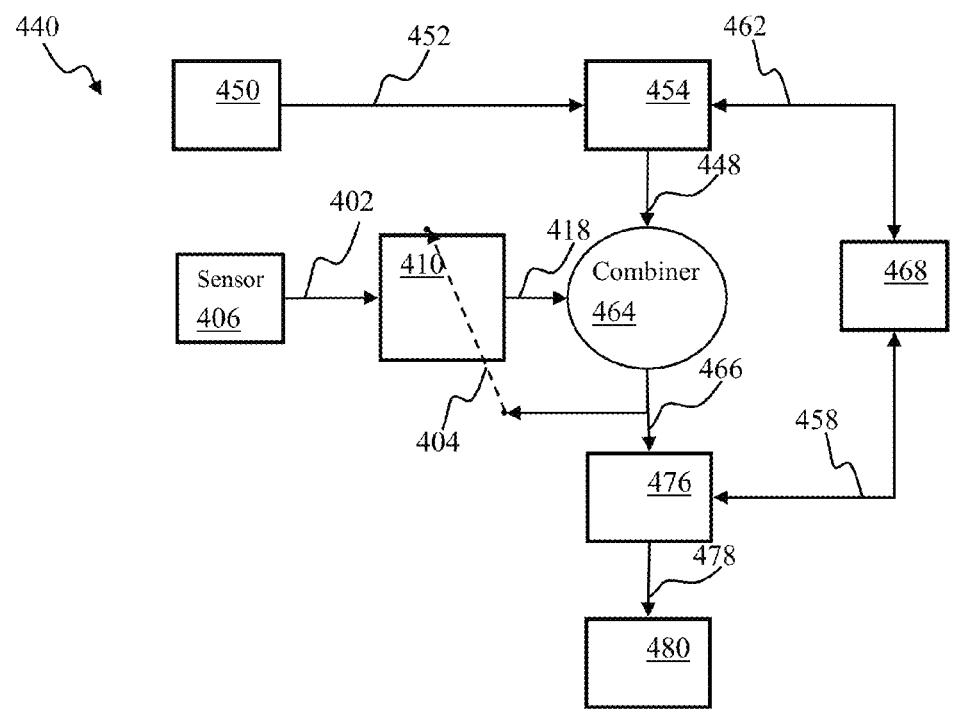
FIG. 4B is a block diagram illustrating a learning robotic system, according to one or more implementations.
Figure 5:
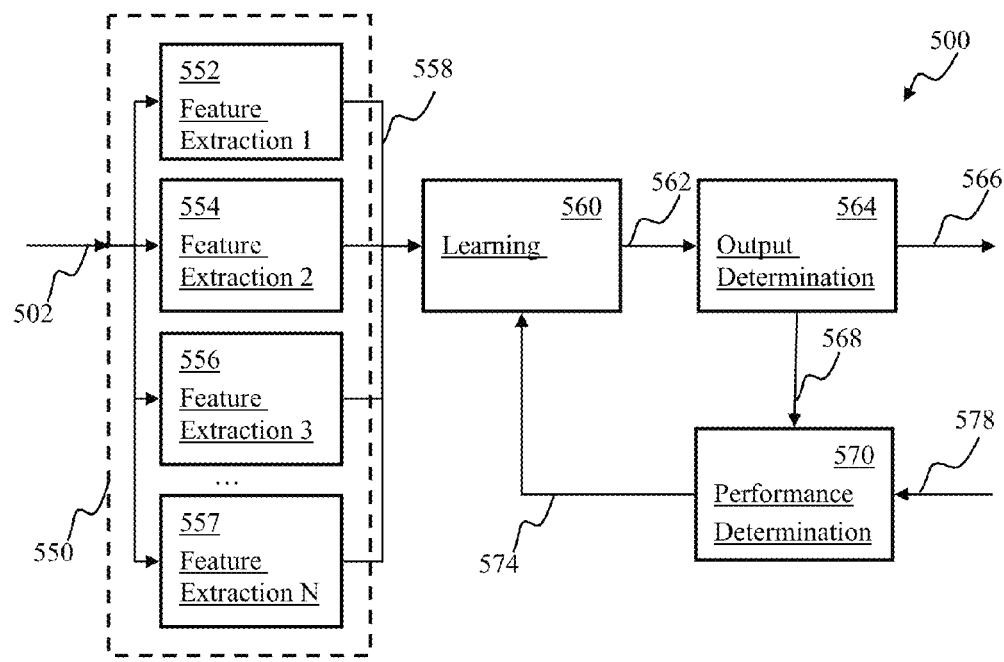
FIG. 5 is a functional block diagram illustrating an adaptive predictor, in accordance with one implementation.

FIG. 1 depicts a mobile robotic apparatus that may be configured with an adaptive controller in accordance with one or more implementations of e.g., the learning apparatuses illustrated in FIGS. 4A-5, infra. The robotic apparatus 110 may comprise a sensor component 116. The sensor component 116 may be characterized by an aperture/field of view 118 (e.g., an extent of the observable world that may be captured by the sensor at a given moment). The sensor component 116 may provide information associated with objects within the field-of-view 118. In one or more implementations, such as object recognition, and/or obstacle avoidance, the output provided by the sensor component 116 may comprise a stream of pixel values associated with one or more digital images. In some implementations of robotic navigation in an arbitrary environment, the sensor component 116 may comprise a camera configured to provide an output comprising a plurality of digital image frames refreshed at, e.g., 25 Hz frame rate. The sensor output may be processed by a learning controller, e.g., as illustrated and described with respect to FIGS. 4A-5 and/or 7A-7F.

In one or more implementations of e.g., video, radar, sonography, x-ray, magnetic resonance imaging, and/or other types of sensing, the sensor 116 output may be based on electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of red/green/blue (RGB) values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure. Pixels and/or groups of pixels associated with objects and/or features in the input frames may be encoded using, for example, latency encoding described in co-owned U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, and entitled "SYSTEMS AND METHODS FOR INVARIANT PULSE LATENCY CODING"; U.S. patent application Ser. No. 13/152,084, filed Jun. 2, 2011, and entitled "APPARATUS AND METHODS FOR PULSE-CODE INVARIANT OBJECT RECOGNITION"; and/or latency encoding comprising a temporal winner take all mechanism described in U.S. patent application Ser. No. 13/757,607, filed Feb. 1, 2013, and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using a spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS" and/or co-owned U.S. patent application Ser. No. 13/756,382filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such as neuron excitability which is described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in co-owned U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. The term "continuous signal" may be used to describe a non-spiking signal (e.g., analog, n-ary digital signal characterized by n-bits of resolution, n>1). In one or more implementations, analog and/or spiking inputs may be processed by mixed signal spiking neurons, such as co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, each of the foregoing being incorporated herein by reference in its entirety.

In some implementations of robotic vehicle navigation, output of the sensor 116 in FIG. 1 may comprise representations of one or more objects (e.g., targets, and/or obstacles). The tasks of the robot may be configured based on a context. In one or more implementations, the context may comprise one or more of robot state (e.g., location or motion information, (position, orientation, speed), platform state or configuration (e.g., manipulator size and/or position), available power and/or other), state of the environment (e.g., object size, location), environmental state (wind, rain), previous state information (e.g., based on historic states of robot motions), and/or other characteristic state information.

Figure 2:
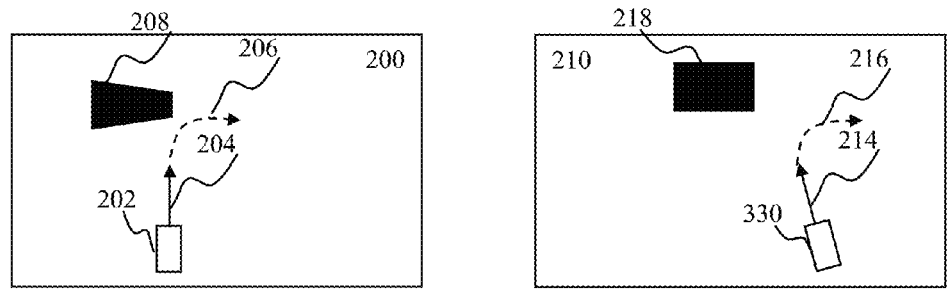
FIG. 2 is a graphical illustration depicting a process for training a robotic device for obstacle avoidance, according to one or more implementations.

For example, the context may correspond to presence, shape, location of an object relative to the robot trajectory as illustrated in FIG. 2. Panels 200, 210 in FIG. 2 illustrate a sample trajectory 204 of a robotic device 202 during training. The device 202 may comprise for example, a learning controller 210 of FIG. 2. The device 202 controller may be trained to avoid obstacle 208 by, e.g., executing a turn 206. During training the controller of the device 202 may be trained to learn associations between the context (e.g., the object 208 and the trajectory 204 characteristics) and the action (e.g., the turn trajectory denoted by broken line arrow 206 in FIG. 2). The controller of the device 202 may receive a teaching signal (not shown during the training operation of panel 200). Subsequent to developing the association between occurrence of an obstacle and the turn trajectory 206, the controller of the device 202 may produce a control signal configured to cause the device 202 to execute the turn maneuver during device operation, as illustrated by panel 210 in FIG. 2. The device 202 in panel 210 may approach the object 218 along the trajectory 214. The controller of the device 202 may determine that the object 218 may comprise an obstacle and cause the device 202 to execute the turn action depicted by broken line arrow 216 in FIG. 2. It is noteworthy, that although the device 202 approach trajectory 214 may not match exactly the device trajectory 204 occurring during training, and/or the shape and/or location of the obstacle 218 in panel 210 may not match exactly the shape and/or location of the obstacle 208 in panel 200, the training information obtained during the previous training (of panel 200) may enable the controller of the device 202 to cause execution of the turn 216 as shown in panel 210 during device operation subsequent to training.

Figure 3:
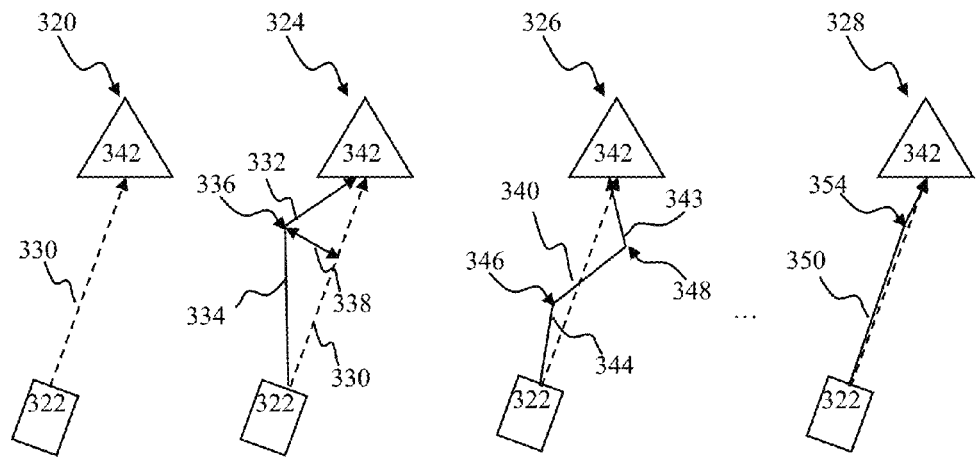
FIG. 3 is a graphical illustration depicting several exemplary trajectories of a robot being trained to perform a target approach task, according to one or more implementations.

FIG. 3 illustrates training of a robotic rover device to approach a target. The robot 322 in FIG. 3 may be configured to approach the target 342 (e.g., a ball, a charging station, and/or other target). The rover 322 may comprise an adaptive controller, e.g., the control system 400 of FIG. 4A. Training may comprise a plurality of trials 320, 324, 326, 328 wherein a teacher may train the adaptive controller of the rover 322 to approach the target 342 along a target trajectory (e.g., depicted by broken line arrow 330). In some implementations, the teacher may comprise a human trainer. During one or more initial trials (e.g., 330 in FIG. 3) the teacher may direct the robot 322 along the target trajectory 330. In some implementations, the teacher may employ a demonstration using remote operation, using one or more applicable user interfaces. Such interfaces may include one or more of: remote controllers (e.g. joysticks, steering wheels, motion controllers, and/or other devices), voice commands (e.g., go forward, turn left or right, and/or other voice commands), a gesture recognition system (e.g., Kinect®), and/or other interfaces.

In one or more implementations, the teacher performs the demonstration with so-called kinesthetic teaching, where the robot is physically guided (e.g., 'dragged') through the trajectory by the teacher. In this approach, the adaptive controller learning process may comprise an inverse model of the robotic platform. The adaptive controller may be configured to translate the changes in the observed robot sensory space to the motor actions that would result in the same sensory space.

In one or more implementations, the robot may employ learning by mimicking methodology. The robot may be configured to observe a demonstrator performing the desired task, and synthesize the motor actions that would result in performance of the same task on its own.

While following a target trajectory, a processor executing a learning process of the robot controller may learn (e.g., via adaptation of learning parameters) an interrelationship between the sensory input, the controller state, and/or the teaching input. In the exemplary training processes illustrated in FIG. 3, the sensory input may comprise data related to robot motion and/or location parameters (position, orientation, speed, acceleration and/or other parameters) and/or target information (video camera output, distance to, color, shape, and/or other information). The teaching input may comprise a motion directive (e.g., the joystick being pushed "forward", "right", "left", etc.), motor control commands (e.g., rotate left wheel clockwise and/or other commands) and/or other teaching input. In some implementations, during the teacher-guided trials (e.g., 320), the motor control output (e.g., 420 in FIG. 4A discussed infra) may be configured solely on the control input from the teacher.

Upon completion of one or more teacher-guided trials (e.g., first trial 320 of FIG. 3), the robot 322 may be configured to perform one or more teacher-assisted trials (e.g., subsequent trials 324, 326, 328 in FIG. 3). During a teacher-assisted trial the adaptive controller of the robot 322 may be configured to generate a predicted control signal (e.g., 418 FIG. 4A). The predicted control signal may be combined with the teacher's user input using any of the methodologies described herein and/or other methodologies. During the trial 324, the robot may progress along the trajectory portion 334. In some implementations, the teacher may withdraw his guidance during the traversal of the trajectory portion 334 so as to assess an ability of the robot to navigate the target trajectory. In some cases the trajectory portion 634 may deviate from the target trajectory 330. Upon determining that the trajectory deviation (denoted by the arrow 338) exceeds a maximum deviation for the task, the teacher may assist the robot controller's learning process by providing user input. In some implementations, the user input may be configured to assist the robot by providing a correction (e.g., turn right by 110°, indicted by the arrow 336). In one or more implementations, the user input may comprise reward/penalty signals to the robot. The reward/penalty signal may be based on the robot entering given states (e.g., reward for robot orienting itself towards the target, penalty for orienting away from the target); and/or taking certain actions during trajectory traversal. In some implementations, the user input may comprise a warning and/or a correction signal (e.g., joystick input, an uttered phrase e.g., "more to the right", and/or other action.)

In some cases, the teacher may "start over" by using a reset signal configured to reset to a base state configuration of the learning process. In some implementations, reset may be used to reset neuron states and/or connection weights of a predictor when the predictor generates predicted signals that are inconsistent with the target action (e.g., guides the robot away from a target in target approach task, guides the robot in a circuitous route, results in undesirable behaviors, etc.)

In some implementations, the learning process may be configured to store intermediate learning stages corresponding to one or more portions of the trajectory traversal. By way of illustration, the trajectory portions 344, 340 in FIG. 3 may be stored as individual learning stages (partitions) based on an occurrence of a tag signal. The tag signal may be received from the teacher and/or generated internally by the controller based on one or more criteria (e.g., rate of change of motion, distance from target, performance measure and/or other measure). A reset signal may be utilized to reset (clear) learning data associated with the individual portions; for example, portion 340 may be reset, while portions 343 and 344 remain intact. In some implementations, the adaptive controller may be configured to store its state at the time of the tag signal. Upon receiving a reset signal at a subsequent time, the controller may be configured to revert to learning data prior to the tag (i.e., resetting learning data subsequent to the tag).

During the one or more teacher-assisted trials 324, 326, 328 teaching input may be provided one or more times, as illustrated by arrows 336, 346, 348 in FIG. 3. While following a trajectory during the one or more teacher-assisted trials 324, 326, 328, a learning process of the robot controller may learn an interrelationship between the sensory input (e.g., via adaptation of learning parameters), the controller state (e.g., predicted control signal), and/or the teaching input.

During the successive one or more teacher-assisted trials 324, 326, 328 the performance of the robot may improve as determined based on a performance measure. In some implementations, the performance measure may comprise a discrepancy measure between the actual robot trajectory (e.g., 332, 334, 344, 340, 343) and the target trajectory (e.g., 330). The discrepancy measure may comprise one or more statistics including without limitation: a maximum deviation, a maximum absolute deviation, an average absolute deviation, a mean absolute deviation, a mean difference, a root mean squatter error, a cumulative deviation, and/or other measures.

Upon completion of one or more teacher-assisted trials (e.g., 324, 326, 328), the robot 322 may be configured to navigate the target trajectory absent user input (not shown in FIG. 3). The learning by the robot during previous trials may enable navigation of the target trajectory by the robot that is within the training performance margin. It is noteworthy that, during teacher-assisted training trials, the user and the robot may cooperate with one another (e.g., via the use of the combiner 414 of FIG. 4A) in order to accomplish a target action (e.g., navigate the trajectory 330 of FIG. 3). In some implementations, the trained behavior (e.g., a target trajectory) may comprise a generalized trait (e.g., avoid obstacles; stay on a surface, and/or other). A path of the robot associated with such behavior may be referred to as the target trajectory (that may be one of many attainable trajectories that may comply with the task cost function).

Various methodologies may be utilized in order to develop associations between sensory context and robot actions (caused by user remote control commands) configured to produce a control signal.

FIG. 4A illustrates an implementation of adaptive control system 400 configured to operate a robotic device (e.g., the rover 110 in FIG. 1). The adaptive control system 400 of FIG. 4A may comprise a corrector 424, an adaptive predictor 410, and a combiner 414 cooperating to control a robotic platform 430.

The system 400 of FIG. 4A may receive sensory input 402 provided by, e.g., the camera 116 of FIG. 1. The system 400 of FIG. 4A may operate a learning process configured to produce output 420 configured to operate the platform 430. The output 420 may comprise one or more control commands configured to cause a robotic device (e.g., the rover 110 of FIG. 1) to execute a task, e.g., as illustrated and described with respect to FIGS. 2-3.

In some implementations, the predictor 410 learning process may be configured to detect targets and/or obstacles based on sensory input (e.g., 402 in FIG. 4A). In some implementations, the detection may be configured based on an operation of a multi-layer perceptron and/or a convolutional network. In some implementations, the predictor learning process may be configured based on one or more look-up tables (LUT).

The learning process of the adaptive predictor 410 may comprise a supervised learning process, a reinforcement learning process, and/or a combination thereof. The corrector 424, the predictor 410 and the combiner 414 may cooperate to produce a control signal 420 for the robotic platform 430. In one or more implementations, the control signal 420 may comprise one or more motor commands (e.g., pan camera to the right, turn right wheel forward), sensor acquisition commands (e.g., use high resolution camera mode), and/or other commands.

The predictor learning process may be configured in one or more implementations on a target control signal 408 provided by the corrector. The corrector 424 may comprise a control entity configured to determine the target signal (correction) 408 based on one or more of (i) sensory information related to operation of the robotic platform and (ii) feedback from the platform (not shown). In some implementations, the feedback may comprise proprioceptive signals, such as feedback from servo motors, joint position sensors, and/or torque resistance. In some implementations, the sensory information may comprise the input 402 (or a portion thereof) and/or information obtained using other sensing means (e.g., audio/visual input of a human trainer). In one or more implementations, the control entity providing the input 408 may comprise a human trainer, communicating with the robot via a remote controller (wired and/or wireless) as described in, e.g., in co-owned U.S. patent application Ser. No. 13/842,583 entitled "APPARATUS AND METHODS FOR TRAINING OF ROBOTIC DEVICES", filed Mar. 15, 2013, incorporated by reference supra, and/or in co-owned U.S. patent application Ser. Nos. 14/244,888, entitled "LEARNING APPARATUS AND METHODS FOR CONTROL OF ROBOTIC DEVICES VIA SPOOFING", filed Apr. 3, 2014, and/or Ser. No. 14/489,242 entitled "APPARATUS AND METHODS FOR REMOTELY CONTROLLING ROBOTIC DEVICES", filed Sept. 17, 2014, incorporated herein by reference in their entireties. In some implementations, the control entity may comprise a computerized agent such as a multifunction adaptive controller operable using reinforcement and/or unsupervised learning and capable of training other robotic devices for one and/or multiple tasks.

The control signal 408 may be configured using a plurality of approaches. In some implementations of analog control for robotic vehicle navigation, the signal 408 may comprise target vehicle velocity and target vehicle steering angle (e.g., the turn 206 in FIG. 2). Such implementations may comprise an "override" functionality configured to cause the robotic platform 430 to execute action in accordance with the corrector control signal 408 instead of the predicted control signal 418.

In one or more implementations of analog correction provision for robotic vehicle navigation, the control signal 408 may comprise a correction to the target trajectory (e.g., correction 338 in FIG. 3). The signal 408 may comprise a target "correction" to the current velocity and/or steering angle of the platform 430. In one such implementation, when the signal 408 may comprise a zero signal (or substantially a null value), the platform 430 may continue its operation unaffected.

The adaptive predictor 410 may be configured to generate predicted control signal 418 based on one or more of (i) the sensory input 402 and the platform feedback (not shown). The predictor 410 may comprise a learning process and be configured to adapt learning parameters, e.g., according to a supervised learning rule, and/or other machine learning rules.

Predictor realizations comprising platform feedback, may be employed in applications such as, for example, where: (i) the control action may comprise a sequence of purposefully timed commands (e.g., associated with approaching a stationary target (e.g., a cup) by a robotic manipulator arm), or where (ii) the platform may be characterized by platform state parameters (e.g., arm inertia, and/or motor response time) that change faster than the rate of action updates. Parameters of a subsequent command within the sequence may depend on the control plant state; a "control plant" refers to the logical combination of the process being controlled and the actuator (often expressed mathematically). For example, control plant feedback might be the exact location and/or position of the arm joints which can be provided to the predictor.

In some implementations, the predictor 410 may comprise a learning process configured to predict the output 420 of the combiner 414 given the input 402. The learning process may be combined with other components that learn to predict the corrector signal given other elements of the sensory context. When the corrector output 408 comprises a zero signal (or null value), the combiner output 420 may equal the predictor output 418. When the corrector provides a non-zero signal, a discrepancy may occur between the prediction 418 and the output 420 of the combiner 414. The discrepancy may be utilized by the predictor 410 in order to adjust parameters of the learning process in order to minimize future discrepancies during subsequent iterations.

In one or more implementations the predictor 410 learning process adjustment may be configured based on a learning input 404. The sensory input, the training input and/or the plant feedback may collectively be referred to as sensory context. The sensory context may be utilized by the predictor 410 to produce the predicted output 418. By way of a non-limiting illustration, one exemplary scenario of obstacle avoidance by an autonomous rover uses an image of an obstacle (e.g., wall representation in the sensory input 402) combined with rover motion (e.g., speed and/or direction) to generate Context_A. When the Context_A is encountered, the control output 420 may comprise one or more commands configured to avoid a collision between the rover and the obstacle. Based on one or more prior encounters of the Context_A—avoidance control output, the predictor may build an association between these events as described in detail below.

The combiner 414 may implement a transfer function h(x) where x includes the control signal 408 and the predicted control signal 418. In some implementations, the combiner 414 operation may be expressed, e.g., as described in detail in co-owned U.S. patent application Ser. No. 13/842,530 entitled "ADAPTIVE PREDICTOR APPARATUS AND METHODS", filed Mar. 15, 2013, incorporated supra. In one or more implementations, the combiner may be characterized by additive, overriding, a combination thereof, and/or touchfader combiner described in, e.g., U.S. Provisional Patent Application Ser. No. 62/059,039 entitled "APPARATUS AND METHODS FOR TRAINING OF ROBOTS", filed Oct. 2, 2014, the foregoing being incorporated herein by reference in its entirety.

In one or more implementations of a multi-channel controller, the corrector may simultaneously provide "no" signal on some channels and "a" signal on others, allowing the user to control one degree of freedom (DOF) of the robotic platform while the predictor may control another DOF.

It will be appreciated by those skilled in the art that various other realizations of the transfer function of the combiner 414 may be applicable (e.g., comprising a Heaviside step function, a sigmoid function, such as the hyperbolic tangent, Gauss error function, logistic function, and/or a stochastic operation).

Operation of the predictor 410 learning process may be aided by a teaching signal 404. As shown in FIG. 4A, the teaching signal 404 may comprise the output 420 of the combiner 414. In some implementations wherein the combiner transfer function may be characterized by a delay, the teaching signal at time $t_i$ may be configured based on values of u, $u^P$ at a prior time $t_{i-1}$, for example as:

$$u^d(t_i)=h(u(t_{i-1}),u^P(t_{i-1})). \quad \text{(Eqn. 1)}$$

The training signal $u^d$ at time $t_i$ may be utilized by the predictor in order to determine the predicted output $u^P$ at a subsequent time $t_{i+1}$, corresponding to the context (e.g., the sensory input x) at time $t_i$:

$$u^P(t_{i+1})=F[x_i, W(u^d(t_i))]. \quad \text{(Eqn. 2)}$$

In Eqn. 2, the function W may refer to a learning process implemented by the predictor, e.g., a perceptron, and/or a look-up table.

In one or more implementations, such as illustrated in FIG. 4A, the sensory input 406, the control signal 408, the predicted output 418, the combined output 420 and/or plant feedback may comprise spiking signals, analog signals, and/or a combination thereof. Analog to spiking and/or spiking to analog signal conversion may be effectuated using, mixed signal spiking neuron networks, such as, for example, described in co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, incorporated supra.

Output 420 of the combiner e.g., 414 in FIG. 4A may be gated. In some implementations, the gating information may be provided to the combiner by the corrector 424 using, e.g., an "override" indication in order to cause the robotic platform 430 to execute actions according to the externally-provided control signal 408 instead of the predicted control signal.

In one such realization of spiking controller output, the control signal 408 may comprise positive spikes indicative of a control command and configured to be combined with the predicted control signal (e.g., 418); the control signal 408 may comprise negative spikes, where the timing of the negative spikes is configured to communicate the control command, and the (negative) amplitude sign is configured to communicate the combination inhibition information to the combiner 414 so as to enable the combiner to 'ignore' the predicted control signal 418 for constructing the combined output 420.

In some implementations of spiking signal output, the combiner 414 may comprise a spiking neuron network; and the control signal 408 may be communicated via two or more connections. One such connection may be configured to communicate spikes indicative of a control command to the combiner neuron; the other connection may be used to communicate an inhibitory signal to the combiner network.

The inhibitory signal may inhibit one or more neurons of the combiner the one or more combiner input neurons of the combiner network thereby effectively removing the predicted control signal from the combined output (e.g., 420 in FIG. 4).

The gating information may be provided to the combiner by another entity (e.g., a human operator controlling the system with a remote control and/or external controller) and/or from another output from the corrector 424 (e.g., an adaptation block, an optimization controller). In one or more implementations, the gating information may comprise one or more of: a command, a memory address of a register storing a flag, a message, an inhibitory efficacy, a value (e.g., a weight of zero to be applied to the predicted control signal by the combiner), and/or other information capable of conveying gating instructions to the combiner.

The gating information may be used by the combiner network to inhibit and/or suppress the transfer function operation. The suppression (or 'veto') may cause the combiner output (e.g., 420) to be comprised solely of the control signal portion 418. In one or more implementations the gating information may be used to suppress (veto') provision of the context signal to the predictor without affecting the combiner output 420. In one or more implementations the gating information may be used to suppress (veto') the feedback from the platform.

In one or more implementations, the gating signal may comprise an inhibitory indication that may be configured to inhibit the output from the combiner. Zero combiner output may, in some realizations, may cause zero teaching signal (e.g., 414 in FIG. 4A) to be provided to the predictor so as to signal to the predictor a discrepancy between the target action (e.g., controller output 408) and the predicted control signal (e.g., output 418).

The gating signal may be used to veto predictor output 418 based on, for example, the predicted control output 418 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

In one or more implementations, the gating/veto functionality may be implemented on a "per-channel" basis in a multi-channel controller wherein some components of the combined control vector may comprise predicted components, while some components may comprise the corrector components.

By way of a non-limiting illustration, if the turn is to be completed and/or aborted (due to, for example, a trajectory change and/or sensory input change), and the predictor output still produces turn instructions to the plant, the gating signal may cause the combiner to veto (ignore) the predictor contribution and pass through the controller contribution.

Predicted control signal 418 and the control input 408 may be of opposite signs. In one or more implementations, a positive predicted control signal (e.g., 418) may exceed the target output that may be appropriate for performance of as task. The control signal 408 may be configured to include negative signaling in order to compensate for over-prediction by the predictor.

Gating and/or sign reversal of controller outputs may be useful, for example, where the predictor output is incompatible with the sensory input (e.g., navigating towards a wrong target). Rapid changes in the environment (compared to the predictor learning time scale caused by e.g., appearance of a new obstacle, target disappearance), may require an "override" capability for the controller (and/or supervisor) to 'override' predictor output. In one or more implementations compensation for over-prediction may be controlled by a graded form of the gating signal.

FIG. 4B illustrates a learning robotic system 440 according to one or more implementations. The system 440 of FIG. 4B may be configured to operate a robotic platform 480 (e.g., the vehicle 110 of FIG. 1) based on analysis of sensor information.

The system 440 may comprise an adaptive predictor 410 configured to produce predicted control output 418. The predictor 410 may be trained using a corrector component 450 using online training methodology described herein. The training may be performed by a trainer performing a target task (e.g., following the trajectory 330 of FIG. 3) with the robotic device 480. In some implementations, the corrector component 450 may comprise a computerized agent (e.g., comprising a trained adaptive controller 400 of FIG. 4A) configured to operate the robotic device 480 in accordance with a target trajectory. In some implementations, the corrector component 450 may comprise a remote control handset comprising a wireless signal transmitter (e.g., IR, RF, light) such as, e.g., described in co-owned U.S. patent application Ser. No. 14/244,892 entitled "SPOOFING REMOTE CONTROL APPARATUS AND METHODS", filed on Apr. 3, 2014, the foregoing being incorporated herein by reference in its entirety. The output 452 of the component 450 may comprise one or more instructions and/or signaling (corrector instructions and/or signals) configured to cause the robotic device 480 to perform an action (e.g., execute turn 206 in FIG. 2).

The corrector 450 operation may be characterized by a control state space. In some implementations of analog state space control wherein the corrector output may comprise a target control parameter, the instructions 452 may comprise the target velocity V and/or the target steering angle ω, e.g., shown in Table 2. An "override" indication may be utilized in order to convey to the combiner 464 that the correction instructions 452 may take precedence (override) the prediction 418 in FIG. 4B.

In some implementations of analog state space correction, wherein the corrector output may comprise a target correction (adjustment) to the current value of velocity V and/or current steering angle ω. If the corrector output comprises zero (null) signal, the robotic platform may continue its operation in accordance with the current velocity V and/or current steering angle ω.

In one or more implementations of discrete state space correction, actions of the robot may be encoded into a plurality of discrete states (e.g., 9 states as shown in Table 2, states, wherein 8 states may indicate 8 possible directions of motion shown in Table 2, one state for "stay-still" and one for "neutral", and/or other state representations). In some discrete state implementations, a default state value may be assigned to the neutral state so that if the corrector may output a neutral signal, the predictor may be able to control the robot directly.

In some implementations of a probabilistic state space control, actions of the robot may be represented by a 9-element vector indicating probabilities associated with a respective state. The combiner 646 may be configured to apply a multiplicative operation to the predicted output and the corrector output in order to determine a distribution associated with a target control state.

In some implementations the combiner component 464 of FIG. 4B (and/or 414 in FIG. 4A) may be configured to implement an override functionality wherein a non-zero corrector output 452 may be provided as the combiner output 466; the predicted component 418 may be ignored. In one or more implementation of override combiner for analog control (e.g., continuous state space), an override indication may be used to convey to the combiner that the correction component (e.g., 408, 452 in FIGS. 4A-4B) may override (take precedence) over the predicted component (e.g., 418 in FIG. 4B).

In some implementations the combiner component 464 of FIG. 4B (and/or 414 in FIG. 4A) may be configured to implement an additive combiner process wherein the combiner output 466 of FIG. 4B (and/or 420 in FIG. 4A) may comprise a sum of the predictor output and the corrector output.

In some implementations the combiner component 464 of FIG. 4B (and/or 414 in FIG. 4A) may be configured to implement a probabilistic combiner process. The probabilistic combiner may be employed with the probabilistic control space. The probabilistic combiner process may be used to produce combined output 466 of FIG. 4B (and/or 420 in FIG. 4A) configured based on a multiplication operation of the predicted distributions and the corrector distribution to determine an output distribution over possible states.

The system 440 may further comprise a sensor component 406 configured to provide information related to task execution by the robotic device 480. In some implementations, such as navigation, classification, object recognition, and/or obstacle avoidance, the information 402 provided by the sensor component 406 may comprise the input 402, 702 described above with respect to FIG. 4A and/or 7A-7F (e.g., sequence of video frames).

The system 440 may comprise an interface component 454 (also referred to as an adapter) configured to detect instructions 452. In some implementations, the interface component 454 may provide one or more output channels 448 wherein individual output channels 448 may be configured to convey information associated with individual control actions, e.g., such as illustrated in Table 4, below:

TABLE 1

| Action | Channel 1 | Channel 2 | Channel 3 | Channel 4 |
|---|---|---|---|---|
| Forward | 1 | 0 | 0 | 0 |
| Backward | 0 | 1 | 0 | 0 |
| Left | 0 | 0 | 1 | 0 |
| Right | 0 | 0 | 0 | 1 |

The adapter component 454 may be configured to adapt the format of the instructions 452 to a specific format of the combiner 464 and/or the learning process of the predictor 410. By way of an illustration, the predictor 410 learning process may be configured to operate using three discrete states wherein a state value "1" may denote activation of a given signal (e.g., motor on); a state value of "0" may denote signal de-activation (e.g., motor off); and a high impedance value (e.g., "0.5") may be configured to leave the signal as is (i.e., in an active or inactive state).

In some implementations of binary control, the adapter component 454 may convert binary control 452 into the above discrete states, in some implementations. By way of an illustration, a "FORWARD" instruction may be expressed as {1, 0, 0, 0} while output 448 of the adapter component 454 may be configured as {1, Z, Z, Z}. In some implementations, the adapter 454 may receive such information (e.g., shown in Table 4) from a translation component 468 via pathway 462. The translation component 468 may comprise a bi-directional look up table comprising transcoding information (e.g., information in Table 1).

The adaptive predictor 410 may operate a learning process configured to produce the output 418. In some implementations of robotic operation and/or control, the output 418 may comprise signals and/or instructions corresponding to a respective channel 448 (e.g., commands forward, backward, left, right illustrated in Table 1). The predictor 410 learning process may be configured based on teaching input 404, comprising output of the combiner 464. In some implementations of robotic operation and/or control, the teaching input 404 may comprise a control signal associated with the target action (target output).

In some implementations, the predictor 410 learning process may be effectuated using a feature learning framework, e.g., such as described in, e.g., U.S. patent application Ser. No. 14/265,113 entitled "TRAINABLE CONVOLUTIONAL NETWORK APPARATUS AND METHODS FOR OPERATING A ROBOTIC VEHICLE", filed Apr. 29, 2014, incorporated supra.

The adaptive predictor 410 and the combiner 464 may cooperate to produce a control output 466 useful for operating the robotic device 480. In one or more implementations, the output 466 may comprise one or more motor commands configured to cause one or more actions (e.g., pan camera to the right, turn right wheel forward, and/or other actions), configure sensor acquisition parameters (e.g., use high resolution camera mode, and/or other parameters), and/or other commands. In some implementations, the output 466 of the combiner 464 may be coupled to an adapter component 476. The adapter component 476 may be configured to transform the combiner output 466 to format 478 that may be compatible with the device 480. The adapter component 476 may be provided with information for transcoding predictor signal format into robot-platform specific format 478. In some implementations, the adapter component 476 may receive such information from a component 468 via pathway 458. In some implementations, the adapter component 454 and/or adapter component 476 may be operable to implement transformations illustrated in, e.g., Table 1.

In some implementations of analog control and/or analog correction modes of operation of the apparatus 440, the adapter component 476 may be configured to rescale the drive and/or steering signals to an appropriate range for the motors of the robotic platform 480.

In some implementations of discrete state space control mode of operation of the apparatus 440, the adapter component 476 may be configured to convert an integer control output 466 into a steering/drive command for the motors of the robotic platform 480.

In some implementations of stochastic control mode of operation of the apparatus 440, the adapter component 476 may be configured to perform an argmax of the control vector, in order to obtain, e.g., a steering/drive command. In some implementations, the adapter component 476 may be configured to perform a weighted average operation, using output values 466 that may be associated with one or more control states (e.g., shown in Table 1) in order to determine a most appropriate control output (e.g., average probability) that may correspond to a value between these states.

In some implementations, the predictor 410 and the combiner 464 components may be configured to operate one or more a plurality of robotic platforms. The combiner output signal 466 may be adapted by the adapter component 476 in accordance with a specific implementation of a given platform 480. In one or more implementations of robotic vehicle control, the adaptation by the component 476 may comprise translating binary signal representation 420 into one or more formats (e.g., pulse code modulation) that may be utilized by given robotic vehicle. U.S. patent application Ser. No. 14/244,890 entitled "LEARNING APPARATUS AND METHODS FOR CONTROL OF ROBOTIC DEVICES", filed Apr. 3, 2014 describes some implementations of control signal conversion.

In some implementations of the component 476 corresponding to the analog control and/or analog corrector implementations, the adapter may be further configured to rescale the drive and/or steering signals to a range appropriate for the motors and/or actuators of the platform 480.

In some implementations of the discrete state space control implementation of the corrector 450, the component 476 may be configured to convert an integer control index into a corresponding steering/drive command using, e.g. a look up table, shown in Table 2. The control state space transformation illustrated in Table 2 may be employed by a controller apparatus, e.g., described with respect to FIGS. 4A-4B. In some implementations of robotic vehicle navigation (e.g., 110 in FIG. 1) the control state space transformation shown in Table 2 may be characterized by a drive component (e.g., linear velocity v) and a turn component (e.g., angular velocity ω). The component values (v,ω) that may be applied to motors of the vehicle 110 of FIG. 1 may be selected from a range between 0 and 1, as shown Table 2. In some implementations, the predictor 410 may be configured to operate using one or more discrete states. A mapping may be employed in order to transfer control commands from a platform space (e.g., continuous range) into discrete states. Rectangular areas of the continuous state space may correspond to the following discrete actions listed in Table 1:

TABLE 2

| V value | ω value | Action |
|---|---|---|
| [⅔ ÷ 1] | [0 ÷ ⅓] | FORWARD-LEFT |
| [⅔ ÷ 1] | [⅓ ÷ ⅔] | FORWARD |
| [⅔ ÷ 1] | [⅔ ÷ 1] | FORWARD RIGHT |
| [⅓ ÷ ⅔] | [0 ÷ ⅓] | LEFT |
| [⅓ ÷ ⅔] | [⅓ ÷ ⅔] | STILL |
| [⅓ ÷ ⅔] | [⅔ ÷ 1] | RIGHT |
| [0 ÷ ⅓] | [0 ÷ ⅓] | BACK-LEFT |
| [0 ÷ ⅓] | [⅓ ÷ ⅔] | BACK |
| [0 ÷ ⅓] | [⅔ ÷ 1] | BACK-RIGHT |

A value (v,ω) falling within one of the platform space portions is translated to the associated respective discrete control command. For example, a combination of the value of linear velocity V falling within the range [⅔÷1] and the value of angular velocity ω falling within the range [⅔÷1] may produce a FORWARD RIGHT action.

In some implementations of the adapters 454, 476 corresponding to a continuous control space corrector 450 implementations, the adapter 454 may be configured to apply an argmax operation (i.e., the set of values for which a corresponding function attains its largest resultant value) to the control vector so as to transform the continuous control data into discrete steering/drive commands corresponding to actions shown Table 1. In one or more continuous signal adapter implementations, the adapter may be configured to apply an interpolation operation between two or more activation control states to determine a control command corresponding to an intermediate value between these states.

In some implementations the adapter 454 and/or 476 may be configured to map the user's control signal in (velocity v, rate of rotation w) space (v,w) into a vector of dimension N; and the adapter may be configured to map a vector of dimension N into a control signal in the space (v,w). By way of an illustration of a continuous signal adapter implementation, a control vector C may be configured in a range [[0, 1]^2] (where R^n is used to define an n-dimensional range (i.e., a square area in this case)). The individual element of the control vector C may contain individual control commands (for example a pair of analog signals for turning a remote-controlled vehicle, and a drive signal for driving the remote-controlled vehicle forward).

In some implementations of encoding a control signal comprising a bi-polar velocity v signal and rate of rotation w, an encoder (e.g., the adapter 454 in FIG. 4B) may be configured to rectify one or both continuous components (e.g., v and/or w) into a range [−1, 1]. Discretizing the continuous components (e.g., v and/or w) into a discrete range of values (e.g., (−1, −0.5, 0, 0.5, 1) facilitate control signal determination by the predictor (e.g., 410 in FIG. 4B).

In some implementations of state space for vehicle navigation, the actions of the platform 480 may be encoded using, e.g., a 1-of-10 integer signal, where eight (8) states indicate 8 possible directions of motion (e.g., forward-left, forward, forward-right, left, right, back-left, back, back-right), one state indicates "stay-still", and one state indicates "neutral". The neutral state may comprise a default state. When the corrector outputs a neutral state, the predictor may control the robot directly. It will be appreciated by those skilled in the arts that various other encoding approaches may be utilized in accordance with controlled configuration of the platform (e.g., controllable degrees of freedom).

In some implementations of control for a vehicle navigation, the action space of the platform 480 may be represented as a 9-element state vector, e.g., as described with respect to Table 2. Individual elements of the state vector may indicate the probability of the platform being subjected to (i.e., controlled within) a given control state. In one such implementation, output 418 of the predictor 410 in FIG. 4B may be multiplied with the output 448 of the corrector 450 in order to determine probability of a given control state.

Training illustrated and described with respect to FIGS. 2-3 may be implemented using an online training approach. As used herein, the term "online training" or "training at runtime" may be used to refer to training implementations where training time intervals and operation time intervals overlap and/or coincide with one another. During online learning, a robot may navigate a trajectory based on control commands generated by a learning process of the robot. At a given time instance, the robot may receive a teaching input, modify the learning process based on the teaching input and the learning process configuration (e.g., an artificial neuron network (ANN) a look-up table (LUT), and/or other configuration), and subsequently navigate the trajectory based on the modified process thus timely incorporating the teaching input. In some implementations, in a given online learning trial, the configuration of the adaptive controller may be adjusted based on teaching input determined during the trial so as to determine controller output for that trial. By way of an illustration, the actions 206, 216 may be executed during a single trial (or a portion thereof) wherein the action 216 may be performed based on an online adjustment of the learning parameters associated with the action 206 execution.

In one or more implementations, e.g., such as described in U.S. patent application Ser. No. 14/265,113 entitled "TRAINABLE CONVOLUTIONAL NETWORK APPARATUS AND METHODS FOR OPERATING A ROBOTIC VEHICLE", filed Apr. 29, 2014, incorporated supra, the learning process may comprise an ANN comprising an input layer of nodes (e.g., configured to receive sensory input) and an output layer of nodes (e.g., configured to produce output actions (motor command)).

The network may be configured to receive one or more images from a camera and learn to predict the motor output signal from these images in real-time. This learning may be configured based on error back-propagation algorithm, which consists of computing a "cost"—a scalar value quantifying the discrepancy between the predicted motor signal and the actual motor signal, and minimizing the trainable parameters of the convolutional network with respect to this cost using gradient-descent.

Nodes of the input layer may be coupled to nodes of the output layer via a plurality (array) of connections. Layer-to-layer connectivity may be characterized by a matrix containing information related to which nodes of one layer connected to nodes of the other layer. In some ANN implementations, a given node of the input layer may be connected to every node of the output layer so that a given node of the output layer may be connected to every node of the input layer. Such connectivity may be referred to as all-to-all and/or fully connected. Various other connectivity techniques may utilized such as, e.g., all to some, some to some, random connectivity, and/or other methods.

In some implementations, the ANN may comprise additional (hidden) layers of nodes. Pair of layers may be connected by a convolutional kernel and/or a fully connected weight matrix (e.g., implementing all-to-all connectivity).

FIG. 5 illustrates an adaptive predictor apparatus, in accordance with one implementation. The apparatus 500 may be configured for operation with a robotic control system (e.g., the predictor component 410 of the system 400 and/or 440 described above with respect to FIGS. 4A-4B). The predictor apparatus 500 may comprise a feature detection (FD) component 500 comprised of one or more feature detectors. Individual feature detectors 557, 552, 554, 556 may be configured to process sensory input 502 in order to determine presence of one or more features in the input 502. In some implementations, the sensory input 502 may comprise data from one or more sensors (e.g., video, audio, IR, RF, ultrasonic, weather, and/or other sensors) characterizing environment of the robot, robotic platform feedback (e.g., motor torque, battery status, current draw, and/or other parameter). In one or more implementations of visual data processing, the features that may be detected in the sensory input may comprise representations of objects, corner, edges, patches of texture, color, brightness, and/or other patterns that may be present in visual input 502; audio patterns (e.g., speech elements), and/or other persistent signal patterns that may be relevant to a given task. It is noteworthy, that a given pattern and/or data item (e.g., representation of an orange fruit on a tree and/or time of day) may comprise a relevant feature for one task (e.g., harvesting of oranges) and may be ignored by other tasks (e.g., navigation around trees). The input 502 may comprise the input 402 described above with respect to FIGS. 4A-4B.

Two or more of individual FD 557, 552, 554, 556 may be operable contemporaneous with one another to produce the feature output 558. In one or more implementations, e.g., such as described below with respect to FIGS. 7A-12B, the output 558 may comprise 8 texture (based on e.g., Laws masks) features, 15 edge (based on e.g., Radon transforms) features, 15 edge/corner (based on e.g., Harris operators) features, and 10 motion features. In some implementations, the output 558 may comprise output of a given feature detector (e.g., one of FD 557, 552, 554, 556).

Various feature detection methodologies may be applied to processing of the input 502. In some implementations, the feature detectors 557, 552, 554, 556 may be configured to implement a filter operation (e.g., orange mask to detect orange objects); a Radon transform edge detection; corner detection (e.g., using Harris operator), texture detection (e.g., using Laws masks); patterns of motion (e.g., using optical flow); and/or other methodologies.

Output 558 of the feature detection component 550 may be provided to learning component 560. In some implementations of visual input processing the output of the feature detection process may comprise information related to one or more of edges being present in an image (e.g., orientation and/or location); structure of brightness on scales that are smaller than the image (e.g., texture determined based on brightness variability on scale between 1 and 10 pixels for an image comprised of 800×600 pixels). In some implementations, feature representation may comprise motion information associated with pixels in the image, patches of color, shape type (e.g., rectangle, triangle, car, human, and/or shapes of other objects), shape orientation, size, and/or other characteristics. In one or more implementation wherein the input 502 may comprise frames provided by two or more cameras (e.g., such as described in a co-pending and co-owned U.S. patent application Ser. Nos. 14/326,374 entitled "APPARATUS AND METHODS FOR DISTANCE ESTIMATION USING STEREO IMAGERY", filed Jul. 8 , 2014 and/or Ser. No. 14/285,385 entitled "APPARATUS AND METHODS FOR REAL TIME ESTIMATION OF DIFFERENTIAL MOTION IN LIVE VIDEO", filed May 22, 2014, each of the foregoing being incorporated herein by reference in its entirety) the feature output 558 may comprise depth information (e.g., determined based on analysis of the binocular disparity) related to one or more objects that may be present in the visual scene.

In one or more implementations wherein the feature detection process (e.g., operable by the component 550) may comprise template matching, the output 558 may comprise information related to occurrence and/or characteristics of one or more patterns (e.g., landing pattern for an aircraft, parking stall marking for an autonomous vehicle, audio signature, and/or other patterns) being present in the input 502. In some implementations wherein the input 502 may comprise audio and/or other bands of mechanical waves of pressure and displacement, the output 558 may comprise one or more wave characteristic such as pitch, tone, amplitude, time envelope, duration, spectral energy distribution, spectral envelope, information about rate of change in the individual spectrum bands (e.g., cepstrum), pulse and/or tone code, speech pattern, and/or other characteristics.

In one or more implementations wherein the feature detection process may comprise processing of olfactory signals, the output 558 may comprise indication of presence of one or more smells, chemical compounds, and/or other olfactory indications.

The learning component 560 may be configured to minimize a discrepancy between predicted output 564 and output 578 of the combiner (e.g., the output 466 of the combiner 464 in FIG. 4B). In one or more implementations, the learning component may be configured to operate a supervised learning process comprising one or more of a neural network perceptron, support vector machine (SVM), a Gaussian process, a random forest, a k-nearest neighbor (kNN) mapper (e.g., a classifier/regression) process comprising, e.g., a look up table, and/or other approach. In one or more implementations of ANN predictor, the component 560 learning process may comprise a full connection matrix described in, e.g., U.S. patent application Ser. No. 14/265, 113 entitled "TRAINABLE CONVOLUTIONAL NETWORK APPARATUS AND METHODS FOR OPERATING A ROBOTIC VEHICLE", filed Apr. 29, 2014, incorporated supra. By way of an illustration of the learning component comprising an ANN, the full connection matrix may comprised a plurality of connections between the plurality of features in the input 558 and one or more neurons of the output determination component (the output layer) 564 described below.

In some implementations, the learning component may operate a perceptron learning process comprising a stochastic gradient descent operation. Unlike some prior art batch learning implementations of perceptron, the perceptron implementation of the disclosure may be used to implement online learning by the perceptron process. Online determination of the gradient used by the perceptron process may be configured based on an operation performed on a current input frame (e.g., frame 1202 in FIG. 12A) and a frame from a history buffer configured to store one or more preceding frames (e.g., a circular buffer of frame depth selected between 1 frame and 128 frames). In some implementations, wherein the frame depth may be greater than one, the preceding frame may be selected using a random selection process in order to determine the gradient.

In one or more implementations, the learning component may operate an online random forests learning process. During online learning, online, samples are accumulated in small batches (10 to 50 samples) and a new tree is created for each batch. To limit the computation time as more trees accumulate, a pruning algorithm is used to discard trees (e.g., oldest trees). In some implementations, the learning process may occur asynchronously wherein batches of data may be collected and new trees added in a process separate from the main control thread; classification happens synchronously in the main thread, using the trees available at each moment.

In some implementations of random forests, a given input feature may be compared to a value (e.g., is the feature number 471 greater than 0.7; is feature 223 smaller than 0.3, and/or other). The leaves of the tree may correspond to predicted values/classes for the given input. The average of all the tree outputs for a sample (or a majority vote if they are discrete classes) may comprise the output of the random forest. Individual trees may be constructed to fit a limited number of samples, and used to classify the samples. In order to limit the number of trees oldest trees may be discarded. Alternatively or additionally, the trees with the worst classification precision could be discarded. Also, a more sophisticated averaging algorithm could be used where different trees have different weights and gradient descent is used to tune the weights based on error; then the trees with smaller weights can be pruned out.

In some implementations, the learning component may operate an online KNN learning process comprising a stochastic gradient descent operation. Online KNN implementations may be configured to store (in a memory buffer) training inputs and outputs. For a given test input, KNN process may be configured to determine closest sample(s) in memory to provide the corresponding output (and/or average of outputs). Closeness can be evaluated using Euclidean distance, Manhattan distance, Mahalanobis distance, or a dynamically weighted variation thereof; weights can be dynamically tuned as explained below. In some implementations of online learning within a given computation time interval, a number of training samples may be kept in the memory buffer. Samples in the buffer may be discarded. In some implementations, a random selection process characterized by a uniform probability (e.g., all samples in the buffer may equally likely to be selected) may be used.

In some implementations, weights may be assigned online to components of the input based on a correlation between the respective component and the target output. Given an input/output pair (X,Y), one or more k-nearest neighbors {kXn} of the new input X may be determined in the history buffer containing N previously obtained pairs of X-Y. In some implementations, wherein k may be selected equal 7, the set {kXn} may comprise 7 vectors Xi selected from the N vectors in the history buffer.

In some implementations, the neighbor determination process may be configured based on a distance measure between value of a feature relevant to the output in the new sample X and values of the respective features within the neighboring inputs {kXn}. The relevance of a given feature xi to the output Y may be determined on a correlation measure Ci~R(xi, Y) between the given feature xi and a the output Y. The correlation vector C comprising individual correlation components C={Ci} may be obtained by correlating the input vector X with the output Y. A feature corresponding to a maximum magnitude of the correlation Ci may be selected as most relevant. In some implementations, a plurality of features whose correlation values may exceed a threshold (e.g., correlation coefficient greater than 0.75) may be selected as relevant.

In some implementations, the distance measure may be determined using the Pearson correlation coefficient C between individual component of (X-xm) and respective component of (Y-ym)^2, where xm, ym for m=1 . . . k denote the k nearest neighbors to the new sample (X,Y). Additional instances of new samples (X,Y) may be processed using the above methodology. The resulting correlation coefficients may be utilized to determine an online-average of the Pearson correlation coefficient for a given feature (dimension). The correlation coefficient may be utilized to determine contributions (weights) by individual features using an affine transformation of the average correlation, comprising assigning 0 to negative values, e.g., as follows:

$$w_i = \max(0, a + b \cdot C \text{avg}_i) \tag{Eqn. 3}$$

where values of a and b may be selected as follows in some implementations, a=1 and b=1.

In some implementations, the distance measure from an input sample X to the m-th neighbor $X^m$ in the input memory buffer can be calculated as follows:

$$d^m = \sqrt{\sum_i^N w_i (x_i - x_i^m)^2} \tag{Eqn. 4}$$

where xi denotes i-th element of the current input X, $x_i^m$ denotes i-th element of m-th nearest neighbor and $w_i$ denotes a weight associated with the i-th feature. In order to determine the weight $w_i$, i.e., the relative importance of a given feature, Eqn. 4 may be used.

In some implementations, a random KNN approach, e.g., such as described in U.S. Provisional Patent Application Ser. No. 62/059,039 entitled "APPARATUS AND METHODS FOR TRAINING OF ROBOTS", filed Oct. 2, 2014, incorporated supra, may be used.

In one or more implementations of online KNN learning process, memory buffer size may be configured to store between 500 sample pairs (input/output) and 50000 sample pairs. In some implementations, the memory size may be configured based on a size (e.g. number of bytes) configured to store an input/output pair. By way of an illustration, input features comprising a larger pixel patches and/or patches with higher pixel count (e.g., 200×200) may require greater memory buffer size and/or cause fewer samples to be stored in a given buffer size compared to input features comprising smaller patches (e.g., 20×20 pixels).

In some implementations of online KNN, input storage policy may be configured as follows: given a new sample, if the buffer is not full (e.g., there may exist at least one available memory location) the sample may be stored in an available location; if the buffer is full, the sample may be stored at a random (occupied) memory location with a probability p determined as:

$$p\_insert = memory\_size/total\_number\_of\_samples\_processed; \quad \text{(Eqn. 5)}$$

Accordingly, the probability of the sample being discarded may be determined as 1−p_insert.

In one more implementations of online KNN, the storing policy may be configured based on the average distance between neighboring samples, i.e., average distance between any given sample in the input memory buffer and the plurality of N samples (N=5 in some implementations) with the smallest distance measure to it; given a new sample, N closest neighbor samples in the memory buffer may be determined; the new sample may be stored at a random buffer location with a probability p_insert that may be configured depending on the ratio of the distance of the sample to its nearest neighbors relative to the average distance between nearest neighbors in the memory buffer, e.g., as follows:

$$p\_insert = 1 - [1 - p\_uniform\_insert]^{(s1/s2)}, \quad \text{(Eqn. 6)}$$

where:
p_uniform_insert is the uniform policy described before;
s1 denotes avg distance of new sample to neighbors; and
s2 denotes distance of all samples in buffer to their neighbors.

In some implementations, the policy configured in accordance with Eqn. 6 may be configured to reduce probability of storing samples that may be already well represented in the memory.

Output 562 of the learning component 560 may be provided to output determination component 564. In some implementations wherein the learning component may operate an ANN comprising a connectivity matrix, the output determination component may comprise one or more neurons configured to produce the output 566. By way of an illustration, the output component 564 may comprise neurons NR, NL operable to produce control output for right/left wheel of the robotic vehicle (e.g., 110 in FIG. 1). In one or more implementations of kNN mapper, the output component may comprise a table relating occurrence of a given input feature to a respective output. The output 566 may comprise the output 414 described above with respect to FIGS. 4A-4B. The predicted output 566 may be provided to a combiner component (e.g., 414, 464 in FIGS. 4A-4B, respectively).

The predictor apparatus 500 may comprise a performance determination component 570. The component 570 may be configured to determine performance of the predictor operation based on the predicted output of the component 564 provided via pathway 568 and input 578. The input 578 may comprise, e.g., the training signal 404 comprising the combiner output 420, 464 described with respect to FIGS. 4A-4B. The component 570 may be configured to operate a performance determination process. In some implementations of continuous state space control wherein the output 566 may comprise a continuously valued parameter (e.g., velocity) the performance process may be configured based on a mean squared error determination operation. In some implementations of discrete state space control wherein the output 566 may comprise one or a plurality of discrete states, the performance process may comprise a cross entropy determination operation. Various other performance determination operations may be employed including, e.g., methodologies described in U.S. patent application Ser. No. 13/487,499 entitled STOCHASTIC APPARATUS AND METHODS FOR IMPLEMENTING GENERALIZED LEARNING RULES", filed Jun. 4, 2012, the foregoing being incorporated herein by reference in its entirety.

Output 574 of the performance evaluation component 570 may be provided to the learning component 560. The output 574 may comprise a performance measure configured to be used to update the learning process of the component 560. In one or more implementations of ANN, the learning process adaptation may comprise modification of weights between units of the network. In some implementations of random forest classification, the learning process adaptation may comprise increment/decrement of entries associated with a given feature-output pair.

In some implementation (e.g., such as shown and described with respect to FIGS. 7A-12B below), the feature detection component 550 may be configured to detect features based on a pre-determined configuration (e.g., fixed state feature detection). In one or more implementations, the feature detection component 550 may be configured to operate a learning process, comprising e.g., an ANN. The learning FD may be operated to predict occurrence of one or more features in the input 502 based on occurrence of the respective features in one or more prior images. By way of an illustration of a robotic vehicle approaching a doorway along a straight trajectory, the learning FD may predicted occurrence of the doorway in a subsequent image based on detecting the doorway in one or more preceding images. The trained learning FD may be capable of approximating the features in a more computationally efficient manner (compared to programmed approach) by, e.g., taking advantage of the limited range of inputs the vehicle is going to find during operation.

In some existing approaches to offline learning, sensory input may be available for the duration of the training (training set). The availability of the whole set of sensor data may enable determination of one or more statistical parameters (e.g., mean brightness, variance, and/or other) that may be used for feature detection (e.g., input whitening, normalization, and/or other). Online learning methodologies described herein may access sensory data for present and/or prior trials (e.g., prior trial 320, present trial 324 when performing the present trial 324 in FIG. 3) but not for one or more subsequent trials (e.g., 326, 328 in FIG. 3).

Limited availability of sensor data may obfuscate actual statistics of the sensor input. Additional operations (e.g., input manipulations, feature detection adaptation) may be required to improve accuracy of feature detection when processing sensor data during online training.

In some implementations of input processing during online training, online estimates of the input statistics may be obtained using methodologies described herein. Input processing may comprise background removal, scaling to a given range, clipping to a given range, outlier removal, and/or other operations. By way of an illustration, pixels of an image may be normalized by removing mean value and dividing the result by a standard deviation. The mean value for a given image may be obtained using an online running mean operation wherein pixel values of a plurality of preceding images and of the given image may be accumulated. In some implementations, the mean may be obtained using an exponential mean, a box cart average, and/or other averaging operations. Online input adaptation may improve accuracy of the feature detection process particularly in varying environments (e.g., changes in brightness, and/or other parameters).

In some implementations, output of the feature detection process (e.g., output 558 of the component 550 in FIG. 5, comprising a plurality of features) may be normalized online (e.g., in upon availability of another version of features determined based on another version of the sensory input). In some implementations, input into the predictor may comprise features obtained using two or more FD (e.g., 552, 554, 556, 557 in FIG. 5). Values provided by individual FD process may be characterized by different range and/or mean values. In some implementations of a learning process configured based on a gradient approach, a zero mean unit variance input may provide more robust operation compared to inputs that have different mean and/or variance values. The feature normalization processing may comprise level adjustment (e.g., mean removal), range scaling (e.g., variance normalization), and/or other operations. The mean value for a given population of features may be obtained using an online running mean determination operation as follows. For a given feature of the plurality of features of the input 558 two accumulators may be provided. In some implementations, the accumulators may comprise memory locations configured to store a floating point value (e.g., 32 bit, 64 bit, and/or other bit length). One accumulator may be configured to accumulate a sum of values of the feature; another accumulator may be configured to accumulate square of the feature values. If a feature is updated (e.g., based on processing another input frame) the accumulator may be updated. A counter may be used to store information related to the number of accumulated feature values (frames). Running mean feature M value may be determined based on dividing contents of the value accumulator by the number of accumulated values; an estimate of the feature variance value may be determined based on dividing contents of the square value accumulator by the number of accumulated values and subtracting square of the running mean value M.

Online training methodology of the disclosure may enable adaptation of responses by a robotic device during training and/or operation. In some implementations, training and operation may occur contemporaneously with one another. During initial portion of learning, a trainer may provide training input more frequently to the learning process of the robotic device. Upon observing performance that may match target performance (e.g., lack of collisions with objects) the trainer may refrain from (and/or altogether cease) providing training input. Computations related to input processing (e.g., comprising operations described with respect to FIGS. 7A-7E and/or FIGS. 9A-12B) and/or learning process adaptation may be performed by a computational apparatus disposed onboard of the robotic device. In some implementations, the computational apparatus may comprise a specialized computerized apparatus e.g., bStem™ integrated platform, described in, http://www.braincorporation.com/specs/BStem_SpecSheet_Rev_Nov11_2013.pdf, the foregoing being incorporated herein by reference in its entirety, and/or the apparatus 600 shown and described with respect to FIG. 6 below) configured to operate a learning process.

The bStem integrated platform may be characterized by energy efficiency that may be sufficiently high in order to enable autonomous operation of a robotic device using an onboard electrical power source. In some implementations, the energy efficiency may be characterized by power consumption between 1.5 W and 2.5 W while providing general purpose (e.g., central processing unit (CPU)) processing capacity equivalent to about $2.1 \times 10^8$ floating point operations per second (FLOPS) and contemporaneous parallelized (e.g., graphical processing unit (GPU)) processing capacity of equivalent to about $5 \times 10^{11}$ FLOPS to $6 \times 10^{11}$ FLOPS. In some implementations, a robotic device comprising sensor components and a processing component capable of performing input processing, learning process operation, communications and/or other operations configured to enable the robotic device to learn navigation tasks.

In one or more implementations, the learning process operation may be effectuated by a BrainOS software platform that may include software configured to instantiate modules and/or robotic brain images, and containing learning algorithms not limited to artificial neural networks and other machine learning algorithms. The BrainOS software platform may provide functionality for a software module that may be typical of an operating system including but not limited to: saving, loading, executing, duplicating, restoring, reverting, check pointing, analyzing, debugging, and uploading/downloading operations to/from remote cloud storage. In some implementations, the BrainOS modules or robotic brain images may be used with the intent to control a robotic device and be broadly construed to include actuators and switches as may be present in a home automation system. Performing of input processing and/or adaptation operations onboard in real time may reduce delays that may be associated with transmission of data off the robotic device, improve learning performance and/or reduce training time.

Figure 6:
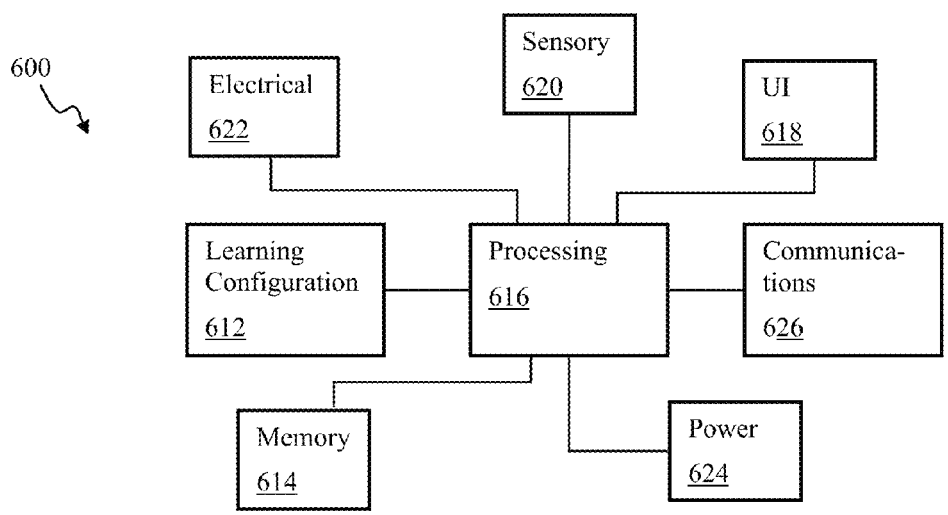
FIG. 6 is a functional block diagram illustrating components of a robotic controller apparatus for use with the feature learning methodology, in accordance with one or more implementations.

FIG. 6 illustrates components of a robotic controller apparatus for use with the online training methodology, in accordance with one or more implementations. The robotic controller apparatus 600 may comprise a learning configuration (robotic brain) component 612 for control of the robotic controller apparatus. The learning configuration component may be logically implemented within a processor that executes a computer program embodied as instructions stored in non-transitory computer readable media, and configured for execution by the processor. In other embodiments, the robotic brain may be implemented as dedicated hardware, programmable logic (e.g., field programmable gate arrays (FPGAs), and/or other logical components), application specific integrated circuits (ASICs), and/or other machine implementations. Additional memory 614 and processing components 616 may be available for other hardware/firmware/software needs of the robotic device. The processing component 616 may interface to the sensory component 620 in order to perform sensory processing e.g., object detection, face tracking, stereo vision, and/or other tasks.

The processing component 616 may interface with the mechanical components 618, sensory components 620, electrical components 622, power components 624, and communications (comms) component 626 via one or more driver interfaces and/or software abstraction layers. In one or more implementations, the power components 624 may comprise one or more of a direct current, an alternating current source, a mechanical coupling, an energy accumulator (and/or a mechanical energy means (e.g., a flywheel, a wind-up apparatus), a wireless charger, a radioisotope thermoelectric generator, a piezo-generator, a dynamo generator, a fuel cell, an internal or external combustion engine, a pneumatic power source, a hydraulic power source, and/or other power sources.

Additional processing and memory capacity (not shown) may be used to support these processes. However, it will be appreciated that the aforementioned components (e.g., mechanical components 618, sensory components 620, electrical components 622) may be fully controlled based on the operation of the learning configuration 612. Supplemental memory and processing capacity may also aid in management of the controller apparatus (e.g. loading executable code (e.g., a computational brain image), replacing the executable code, executing operations during startup, and/or other operations). As used herein, a "computational brain image" may comprise executable code (e.g., binary image files), object code, bytecode, an array of weights for an artificial neuron network (ANN), and/or other computer formats.

Consistent with the present disclosure, the various components of the device may be remotely disposed from one another, and/or aggregated within one of more discrete components. For example, learning configuration software may be executed on a server apparatus, and control the mechanical components of a robot via a network or a radio connection. In another such example, multiple mechanical, sensory, and/or electrical units may be controlled by a single robotic brain via network/radio connectivity.

The mechanical components 618 may include virtually any type of component capable of motion (e.g., to move the robotic apparatus 600, manipulate objects external to the robotic apparatus 600 and/or perform other actions) and/or configured to perform a desired function or task. These may include, without limitation: motors, servos, pumps, hydraulics, pneumatics, stepper motors, rotational plates, micro-electro-mechanical devices (MEMS), electro-active polymers, and/or other motive components. The components interface with the learning configuration and enable physical interaction and manipulation of the device.

The sensory components 620 may enable the robotic device to accept stimulus from external entities. Input stimulus types may include, without limitation: video, audio, haptic, capacitive, radio, accelerometer, ultrasonic, infrared, thermal, radar, lidar, sonar, and/or other sensed inputs.

The electrical components 622 include virtually any electrical component for interaction and manipulation of the external environment. These may include, without limitation: light/radiation generating components (e.g. light emitting diodes (LEDs), infrared (IR) sources, incandescent light sources, etc.), audio components, monitors/displays, switches, heating elements, cooling elements, ultrasound transducers, lasers, and/or other. Such components enable a wide array of potential applications in industry, personal hobbyist, building management, medicine, military/intelligence, and other fields (as discussed below).

The communications component 626 may include one or more connections configured to interact with external computerized devices to allow for, inter alia, management and/or control of the robotic device. The connections may include any of the wireless or wireline interfaces discussed above, and further may include customized or proprietary connections for specific applications.

The power system 624 may be configured to support various use scenarios of the device. For example, for a mobile robot, a wireless power solution (e.g. battery, solar cell, inductive (contactless) power source, rectification, and/or other mobile power source) may be appropriate. However, for fixed location applications which consume significant power (e.g., to move heavy loads, and/or other power intensive tasks), a wall power supply (or similar high capacity solution) may be a better fit. In addition, in some implementations, the power system and or power consumption may be configured with the training of the robotic apparatus 600. Thus, the robot may improve its efficiency (e.g., to consider power consumption efficiency) through learned management techniques specifically tailored to the tasks performed by the robotic apparatus.

FIGS. 7A-7E illustrate feature detection operations for use by, e.g., feature detection component 550 of FIG. 5, in accordance with one or more implementations.

Figure 8:
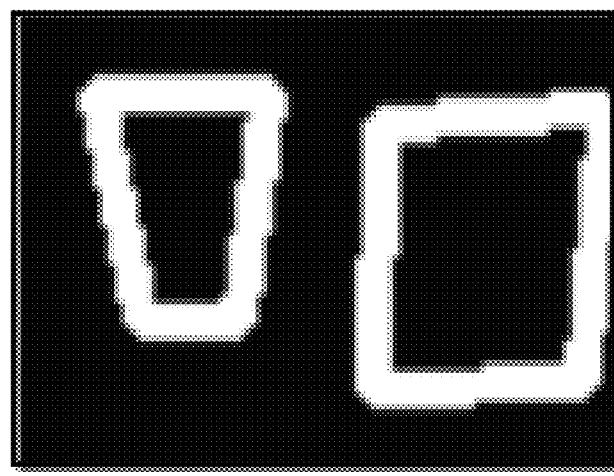
FIG. 8 is a plot illustrating input image used for feature detection, in accordance with one or more implementations.

At operation 704 of the feature detector 700, input 702 may be pre-processed. The input may comprise a variety of sensor data including, e.g., such as described above with respect to FIG. 1. Panel 800 in FIG. 8 presents one example of sensor input comprising an image comprising a representation of an obstacle (e.g., a trashcan and a box). In one or more implementations of e.g., video, radar, sonography, x-ray, magnetic resonance imaging, and/or other types of sensing, the input 702 may be based on electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. In one or more implementations wherein the input 702 may comprise one or more RGB images comprising a two-dimensional matrix of red/green/blue pixel values refreshed at a 25 Hz frame rate, the pre-processing operation 704 may comprise image down-sampling (e.g., to 80×60 pixels in some implementations), image space conversion (e.g., RGB to grayscale, RGB to YUV (e.g., YCbCr space)), buffering of two or more image frames, and/or other operations. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure.

At operation 706 a transformation may be applied to the pre-processed input. In one or more implementation, e.g., such as described below with respect to FIGS. 7B-12B, the transformation operation 706 may comprise a Radon transform, optical flow determination, texture detection using Laws masks, corner detection using, e.g., Harris operator, filter operation (e.g., color mask, low-pass, high-pass), and/or other input transformation.

At operation 708 the transformed output may be partitioned. In some implementations, wherein the preprocessed input may comprise an image 80×60 pixel in size, the partitioning operation may comprise partitioning the image into a plurality of portions (e.g., 20×20 pixel patches). Partitioning may comprise overlapping individual portion with a neighboring portion (e.g., by 50% of width/height), in some implementations.

At operation 710 an output may be determined. In some implementations, the output determination may comprise a sparse coding transformation. The sparse transformation may comprise encoding a plurality of features into one or more output classes (e.g., encoding a floating point number into 5 discrete bins and/or encoding bins of a histogram (e.g., maximum) using one-hot encoding approach). In some implementations, a sparse transformation (sparsification) may comprise activating (selecting) a subset of output elements from a given number of output elements. In some implementations, the subset may comprise selecting fewer than about 15% of available output elements.

In one or more implementations, the output determination operation may comprise a statistical operation (histogram determination, bin-average, determination of min/max, median, mean, standard deviation, random sampling, outlier detection and removal, and/or other operations) may be performed on the partitioned output of operation 710.

Output 712 of the operation 708 may comprise one or more features (e.g., location of corners, edges, patches of color, texture, and/or other features). The output 712 may be provided to a learning component (e.g., the input 558 for the component 560 in FIG. 5).

Figure 7A:
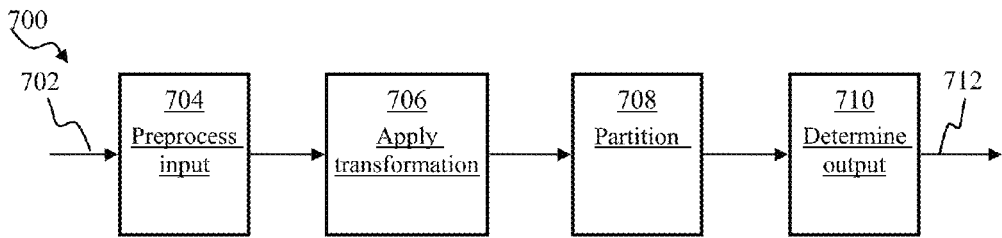
FIG. 7A is a block diagram illustrating feature detection operations for use by, e.g., feature detection component 550 of FIG. 5, in accordance with one or more implementations.
Figure 7B:
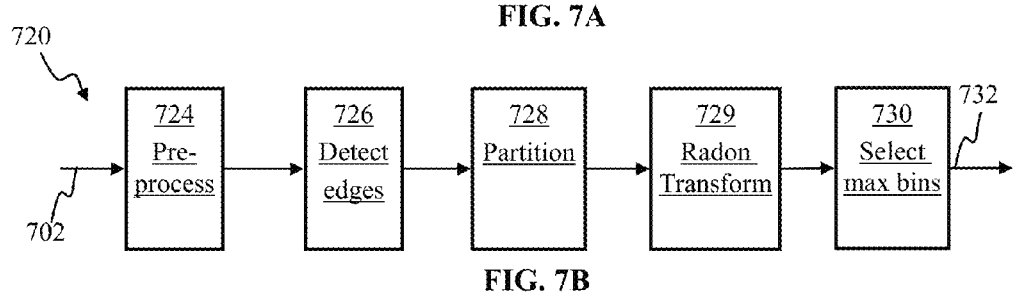
FIG. 7B is a block diagram illustrating operation of a feature detection apparatus configured to determine edges in an image, in accordance with one or more implementations.

FIG. 7B illustrates feature detection comprising edge detection configured to determine edges in an image, in accordance with one or more implementations.

At operation 724 of the feature detector 720, input 702 may be pre-processed. The input may comprise a variety of sensor data e.g., such as described above with respect to FIGS. 1 and/or 7A. In one or more implementations wherein the input 702 may comprise one or more RGB images comprising a two-dimensional matrix of red/green/blue pixel values refreshed at a 25 Hz frame rate, the pre-processing operation 724 may comprise image down-sampling (e.g., to 80×60 pixels in some implementations), and/or image space conversion (e.g., RGB to grayscale). Image 800 of FIG. 8 may comprise pre-processed output.

At operation 726 an edge detection operation may be applied to the pre-processed output. In some implementations, the edge detection may comprise a Canny process. In one exemplary embodiment, the Canny process includes: removing speckles (e.g., pixels whose brightness that may differ substantially from brightness of the neighboring pixels), obtaining an intensity gradient, determine the pixels that are the most different from their neighbors, and determine the beginning and ending of an edge. In one such variant, speckles can be removed with a Gaussian blur. In one variant, a gradient operator may be applied in order to obtain the intensity gradient. In some variants, a non-maximum suppression process is configured to determine pixels that differ most from neighbors. In still other variants, hysteresis thresholding is used to determine a beginning and/or end of an edge. In one or more implementations, other edge detection methodologies may be used, e.g., simple gradient operators, second-order operators based on zero-crossing of second derivatives of the image, detecting phase coherence in the frequency domain, possibly combined with linking and/or thinning operations.

Figure 9A:
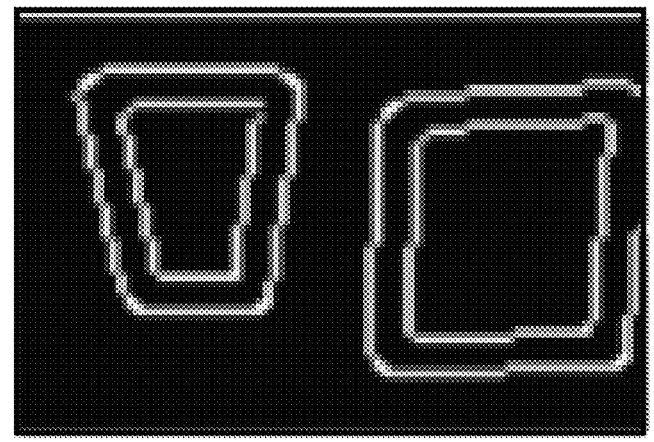
FIGS. 9A-9C depict data related to feature detection based on the Radon transform approach, in accordance with one or more implementations.

Output of the edge detection process may comprise a binary (e.g., black/white) image, e.g., the image 900 shown in FIG. 9A. At operation 728 the output of the edge detection process may be partitioned. In some implementations, the partitioning operation may comprise partitioning an image into 20×20 pixel portions (e.g., the partitions 920, 922, 924, 926 in FIG. 9B) without an overlap. In one or more implementations, the partitioning operation may comprise an overlap between adjacent portions (e.g., 50% of size).

Figure 9B:
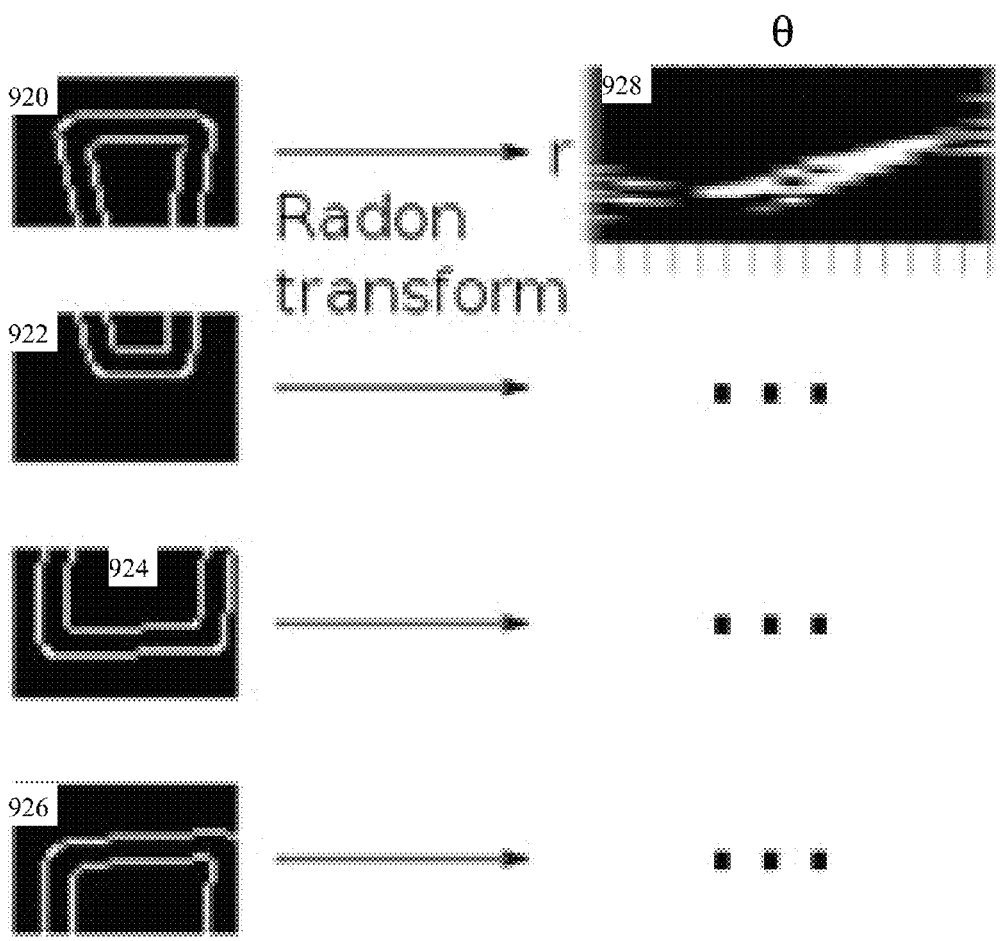

At operation 729 a Radon transform may be applied to individual partitions (e.g., 920, 922, 924, 926 in FIG. 9B) obtained at operation 728. In some implementations, the Radon transform operation may comprise determining projections (ray sum) of a given 20×20 pixel portion onto 12-15 directions and 16-20 ranges. Panel 928 in FIG. 9B depicts output of the Radon transformation (e.g., power accumulated over a ray) of image partition 920 using 15 direction and 16 range bins.

Figure 9C:
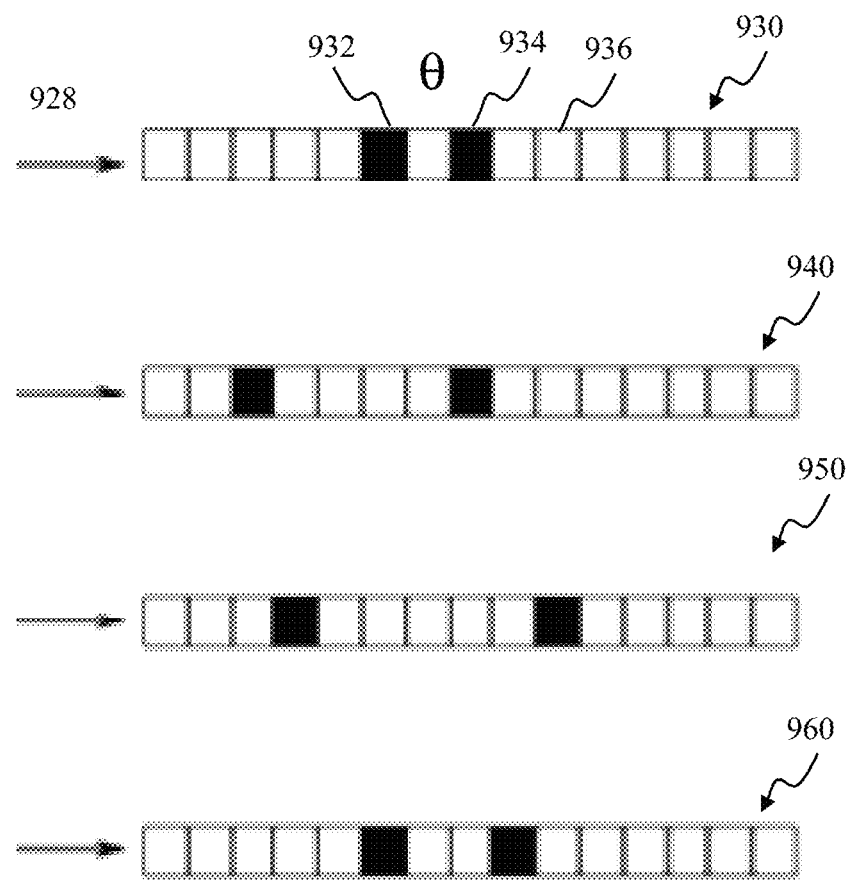

At operation 730 a selection operation may be performed on the output of operation 729. In one or more implementations, the operation 730 may comprise: (i) determining the maximum bin value for each direction of the plurality of directional bins (e.g., 15 bins in FIG. 9C); (ii) selecting the two directions with the greatest maximum bin value; and (iii) discarding (e.g., assigning zero values) to the remaining directions (e.g., 936 in FIG. 9C). FIG. 9C illustrates output of the operation 730. Individual rows (e.g., 930) correspond to partitions of FIG. 9B (e.g., 928 respectively), solid rectangles (e.g., 932, 934) in FIG. 9B denote selected direction bins (e.g., two direction bins with the largest maximum power magnitude); and open rectangles (e.g., 936) in FIG. 9B denote discarded direction bins (e.g., assigned a NaN, a zero and/or other value (e.g., "discard tag") indicating to a processing device that such tagged data may not be used for training).

Output 732 (e.g., rows 930, 940, 950, 960 in FIG. 9C) of the operation 730 may comprise one or more features (e.g., location of edges). The output 732 may be provided to a learning component (e.g., the input 558 for the component 560 in FIG. 5).

Figure 7C:
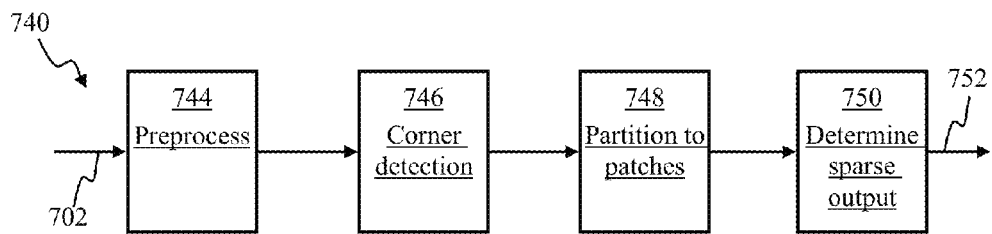
FIG. 7C is a block diagram illustrating operation of a feature detection apparatus configured to determine corners and/or edges in an image using the structure tensor methodology, in accordance with one or more implementations.

FIG. 7C illustrates feature detection operation comprising determination of corners and/or edges in an image using the structure tensor methodology, in accordance with one or more implementations.

At operation 744 of the feature detector 740, input 702 may be pre-processed. The input may comprise a variety of sensor data e.g., such as described above with respect to FIGS. 1 and/or 7A. In one or more implementations wherein the input 702 may comprise one or more RGB images comprising a two-dimensional matrix of red/green/blue pixel values refreshed at a 25 Hz frame rate, the pre-processing operation 744 may comprise image down-sampling (e.g., to 80×60 pixels in some implementations), and/or image space conversion (e.g., RGB to grayscale). Image 800 of FIG. 8 may comprise the pre-processed output.

At operation 746 a corner detection operation may be applied to the pre-processor output. In some implementations, the corner detection may comprise determination of a Harris structure tensor comprising determination of multi-scale image derivatives I_x, I_y in the image domain as well as the summation of non-linear combinations of these derivatives over local neighborhoods. In some implementations, the operation 746 may comprise scale-space smoothing. The term structure tensor, may also be referred to as the second-moment matrix, and may comprise a matrix derived from the gradient of a function. The structure tensor may be used to summarize the predominant directions of the gradient in a specified neighborhood of a point, and the degree to which those directions are coherent. For a function I of two variables p=(x,y), the structure tensor may be expressed using the 2×2 matrix as follows:

$$S_w[p] = \begin{bmatrix} \sum_r w[r](I_x[p-r])^2 & \sum_r w[r]I_x[p-r]I_y[p-r] \\ \sum_r w[r]I_x[p-r]I_y[p-r] & \sum_r w[r](I_y[p-r])^2 \end{bmatrix} \quad \text{(Eqn. 7)}$$

where $I_x$ and $I_y$ are the partial derivatives of the input I with respect to x and y; the integrals range over the plane, and w is a smoothing kernel. In some implementations, for a given pixel of an image (e.g., pixels of the image 800 comprising 80×60 pixels) a 2×2 matrix (the structure tensor) may be determined based on averaging the derivatives (e.g., of Eqn. 7) over a 5×5 pixel neighborhood of the pixel. It will be appreciated by those skilled in the arts that the above example of the smoothing area is one implementation of the disclosure and other values may be used (e.g., 3, 7, 9 pixels). It is noteworthy that smoothing area may be adjusted in accordance with size and/or resolution of the given image (e.g., the image 800).

Figure 10A:
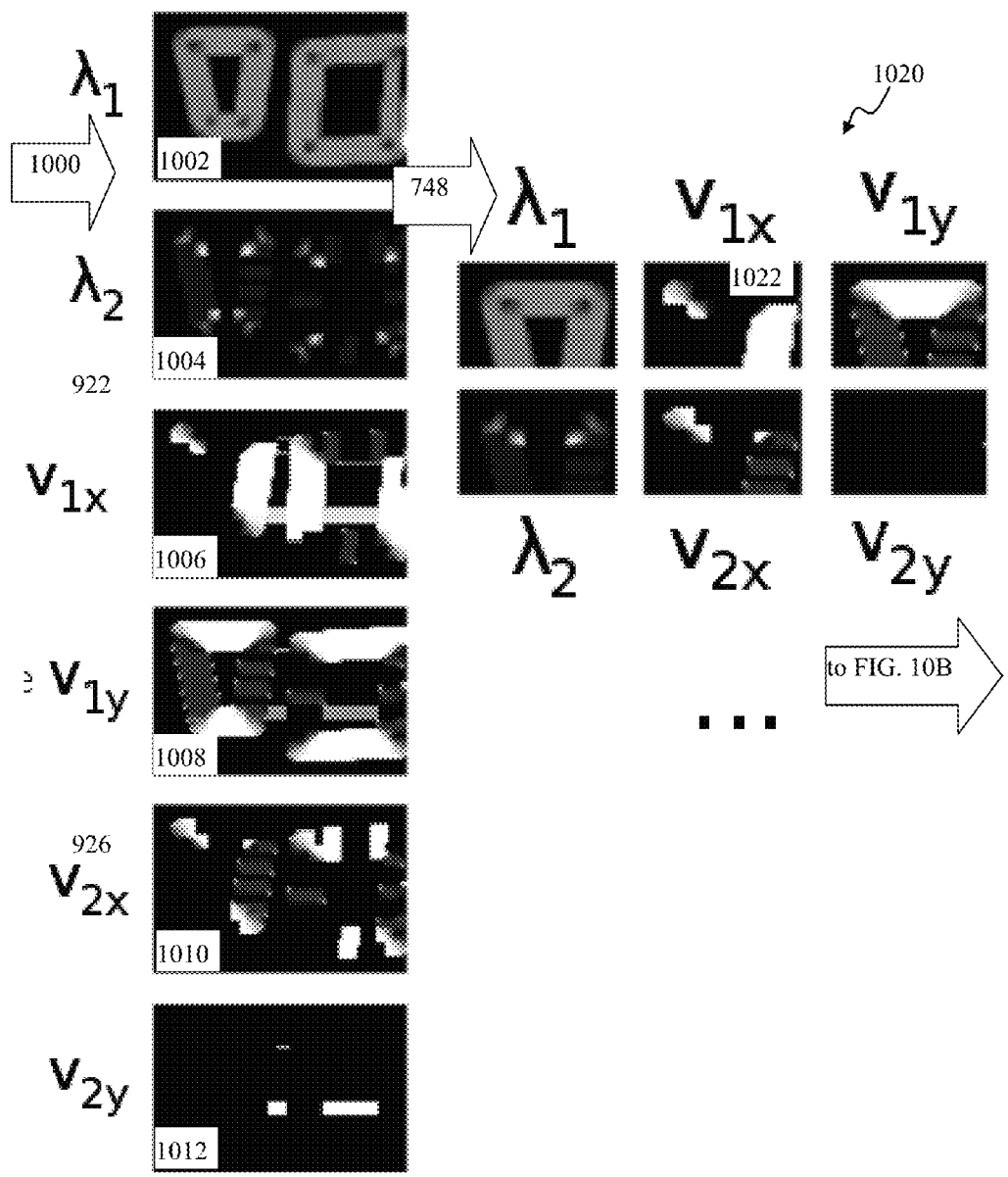
FIGS. 10A-10B depict data related to feature detection based on the Harris edge approach, in accordance with one or more implementations.

Output of the corner detection process may comprise a plurality of component images e.g., the images 1002, 1004, 1006, 1008, 1010, 1012 shown in FIG. 10A. Arrow 1000 in FIG. 10A denotes structure tensor determination operation applied to image 800 of FIG. 8. In FIG. 10A Symbols λ1, λ2 denote the two eigenvalues of the matrix Eqn. 7; {v1x, v1y,}, {v2x, v2y,} denote components of the two eigenvectors v1, v2.

At operation 748 the output of the corner detection process may be partitioned. In some implementations, the partitioning operation 748 may comprise partitioning individual images (e.g., 1002, 1004, 1006, 1008, 1010, 1012 in FIG. 10A) into 20×20 pixel portions (e.g., the partitions 1020) without an overlap. In one or more implementations, the partitioning operation may comprise an overlap between adjacent portions (e.g., 50% of size).

At operation 750 a sparse output may be determined. In some implementations, the sparse transformation operation 750 may comprise: determining a histogram of eigenvalues of individual portions (e.g., 1022) for a plurality of bins (e.g., 15 bins as shown by row 1040 in FIG. 10B); selecting (e.g., assigning a value of 1 to) an element in a vector corresponding to the bin (e.g., bin 1042) with the greatest accumulated value; and (iii) discarding (e.g., assigning zero values to) the remaining bins (e.g., 1043 in FIG. 10B).

Figure 10B:
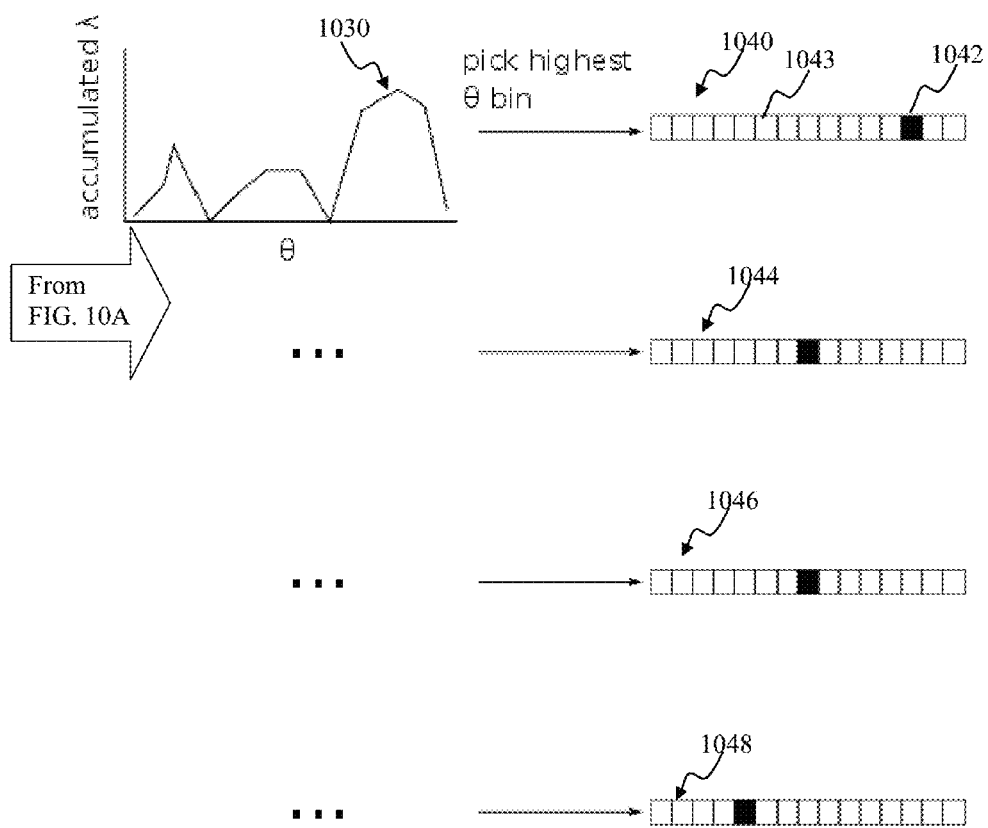

In some implementations, the operation 750 may be referred to as the quantized max operation performed on the output of operation 748. The eigenvector components v1, v2 may be used to determine an angle {arctan (v1y/v1x), arctan (v2y/v2x)}. The resultant angles may be quantized to 15 bins, for example, and a histogram is built on these bins by accumulating the eigenvalues in the bins of the angle of their corresponding eigenvector (e.g., a given pixel in the portion 1022 may contribute two values to the histogram 1030 in FIG. 10B). FIG. 10B illustrates the operation 750. Individual rows (e.g., 1040 in FIG. 10B) correspond to partitions 1020 of FIG. 10A; solid rectangles (e.g., 1042) in FIG. 10B denote selected values (e.g., bins with the greatest power magnitude); and open rectangles (e.g., 1043) in FIG. 10B denote discarded bins (e.g., assigned a NaN, a zero and/or other value (e.g., "discard tag") indicating to a processing device that such tagged data may not be used for training).

Output 752 in FIG. 7C (e.g., rows 1040, 1044, 1046, 1048 in FIG. 10B) of the operation 750 may comprise one or more features (e.g., location of edges and/or corners). The output 752 may be provided to a learning component (e.g., the output 558 for the component 560 in FIG. 5).

Figure 7D:
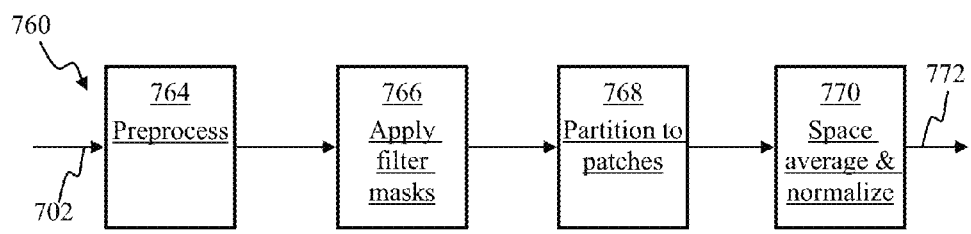
FIG. 7D is a block diagram illustrating operation of a feature detection apparatus configured to determine texture in an image, in accordance with one or more implementations.

FIG. 7D illustrates operation of a feature detection apparatus configured to determine texture in an image, in accordance with one or more implementations.

At operation 764 of the feature detector 760, input 702 may be pre-processed. The input may comprise a variety of sensor data e.g., such as described above with respect to FIGS. 1 and/or 7A. In one or more implementations wherein the input 702 may comprise one or more RGB images comprising a two-dimensional matrix of red/green/blue pixel values refreshed at a 25 Hz frame rate, the pre-processing operation 764 may comprise image down-sampling (e.g., to 80×60 pixels in some implementations), and/or image space conversion (e.g., RGB to YCrCb, e.g., image components 1102, 1104, 1106 in FIG. 11A).

Figure 11A:
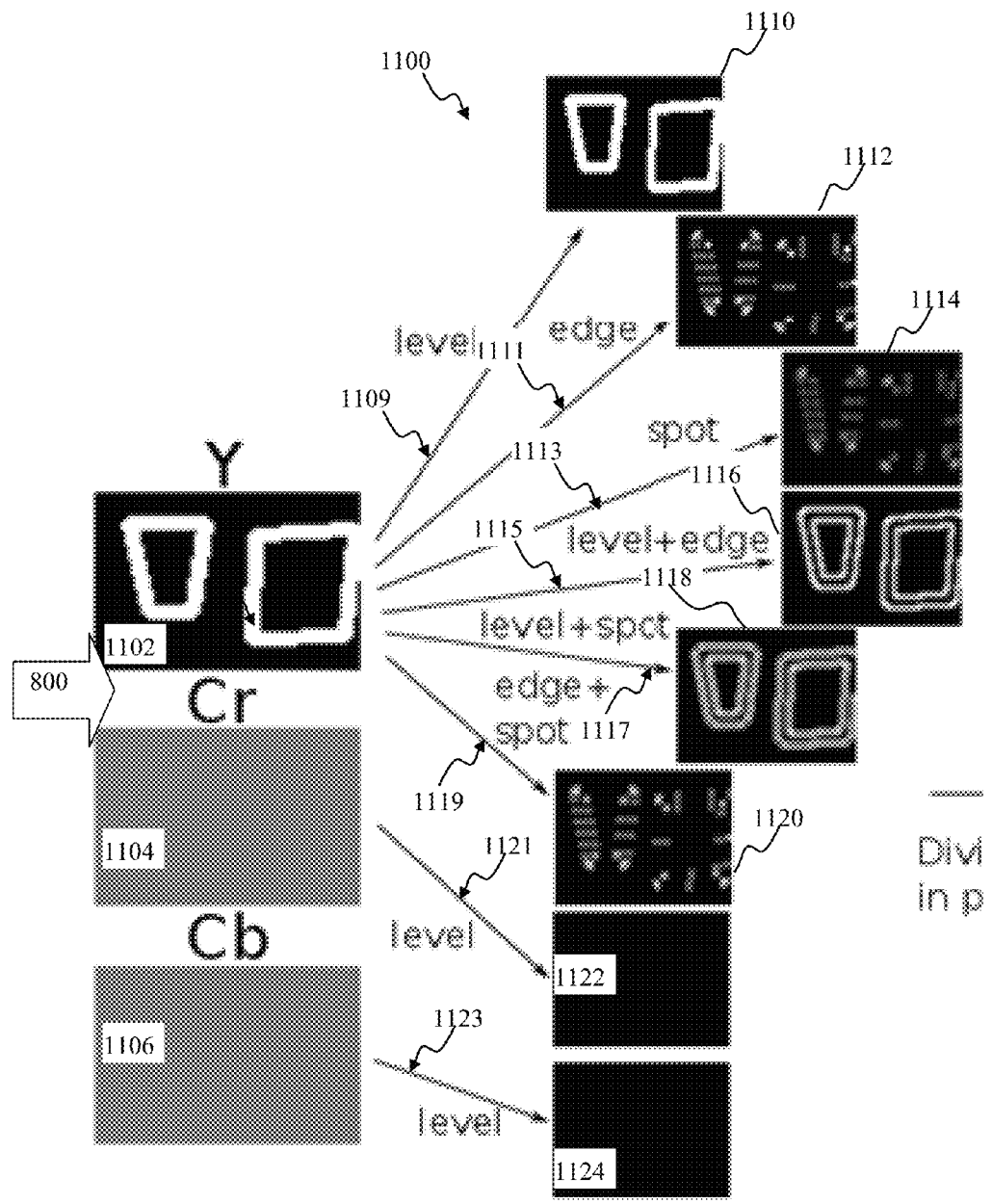
FIGS. 11A-11B depict data related to feature detection based on the Laws masks approach, in accordance with one or more implementations.

At operation 766 one or more filter mask operations may be applied to the pre-processed output, e.g. the images 1102, 1104, 1106 in FIG. 11A. In some implementations, the mask operation 766 may comprise application of Laws masks. Thin arrows in FIG. 11A denote the following mask operations: 1109, 1121, 1123 determination of level in x-y dimensions, 1111 edge determination in x-y dimensions; 1113 spot determination in x-y dimensions; 1115 determination of level and edge in x-y dimensions; 1117 determination of level and spot in x-y dimensions, 1119 determination of edge and spot in x-y dimensions. Each mask is used to filter the image, and the absolute value of the output images is used. Exemplary filtering operations are presented below in Table 3 through Table 8 according to one or more implementations (Im is input image, operator * represents two-dimensional (2D) (convolution):

TABLE 3

| LevelxLevel: abs(Im * | [[ 1   4   6   4   1] |   |
|---|---|---|
|  | [ 4  16  24  16   4] |   |
|  | [ 6  24  36  24   6] |   |
|  | [ 4  16  24  16   4] |   |
|  | [ 1   4   6   4   1]]) | / 256 |

TABLE 4

| EdgexEdge: abs(Im * | [[  1   2   0  -2  -1] |   |
|---|---|---|
|  | [  2   4   0  -4  -2] |   |
|  | [  0   0   0   0   0] |   |
|  | [ -2  -4   0   4   2] |   |
|  | [ -1  -2   0   2   1]]) | / 36 |

TABLE 5

| SpotxSpot: abs(Im * | [[  1   0  -2   0   1] |   |
|---|---|---|
|  | [  0   0   0   0   0] |   |
|  | [ -2   0   4   0  -2] |   |
|  | [  0   0   0   0   0] |   |
|  | [  1   0  -2   0   1]]) | / 16 |

TABLE 6

| EdgexLevel: abs(Im * | [[ -1   -2    0    2    1] |   |
|---|---|---|
|  | [ -4   -8    0    8    4] |   |
|  | [ -6  -12    0   12    6] |   |
|  | [ -4   -8    0    8    4] |   |
|  | [ -1   -2    0    2    1]]) | / 192 |
|  | + |   |
| abs(Im * | [[ -1   -4   -6   -4   -1] |   |
|  | [ -2   -8  -12   -8   -2] |   |
|  | [  0    0    0    0    0] |   |
|  | [  2    8   12    8    2] |   |
|  | [  1    4    6    4    1]]) | / 192 |

TABLE 7

| SpotxLevel: abs(Im * | [[-1    0    2    0   -1] |   |
|---|---|---|
|  | [-4    0    8    0   -4] |   |
|  | [-6    0   12    0   -6] |   |

TABLE 7-continued

```
        [-4    0    8    0   -4]
        [-1    0    2    0   -1]])   / 128
        +
abs(Im * [[-1  -4   -6   -4   -1]
         [ 0    0    0    0    0]
         [ 2    8   12    8    2]
         [ 0    0    0    0    0]
         [-1   -4   -6   -4   -1]])   / 128
```

TABLE 8

```
SpotxEdge: abs(Im * [[ 1    0   -2    0    1]
                    [ 2    0   -4    0    2]
                    [ 0    0    0    0    0]
                    [-2    0    4    0   -2]
                    [-1    0    2    0   -1]])   / 48
                    +
           abs(Im * [[ 1    2    0   -2   -1]
                    [ 0    0    0    0    0]
                    [-2   -4    0    4    2]
                    [ 0    0    0    0    0]
                    [ 1    2    0   -2   -1]])   / 48
```

Output of the mask operation is denoted 1100 and comprises a plurality of images 1110, 1112, 1114, 1116, 1118, 1120, 1122, 1124 in FIG. 11A. Panels denoted 1110, 1112, 1114, 1116, 1118, 1120 in FIG. 11A may depict output of operations 1109, 1111, 1113, 1115, 1117, 1119 applied to the brightness (grayscale) component 1102 of the image 800. Panels denoted 1122, 1124 in FIG. 11A may depict output of operations 1121, 1123 applied to the chromaticity (color) components 1104, 1106 of the image 800.

At operation 768 in FIG. 7D the output 1100 of the mask operation may be partitioned. In some implementations, the partitioning operation 768 may comprise partitioning individual images (e.g., 1110, 1112, 1114, 1116, 1118, 1120, 1122, 1124 in FIG. 11A) into 20×20 pixel portions (e.g., the partition 1032) without an overlap. In one or more implementations, the partitioning operation may comprise an overlap between adjacent portions (e.g., 50% of size).

At operation 770 in FIG. 7D a space averaging and normalization operation may be performed on the output 1130 of operation 768. In one or more implementations, the operation 770 may comprise: for a given partition (e.g., 1132 in FIG. 11B) (i) accumulating pixel values for the partition; and (ii) scaling the cumulative value to a given range (e.g., −1 to 1).

Figure 11B:
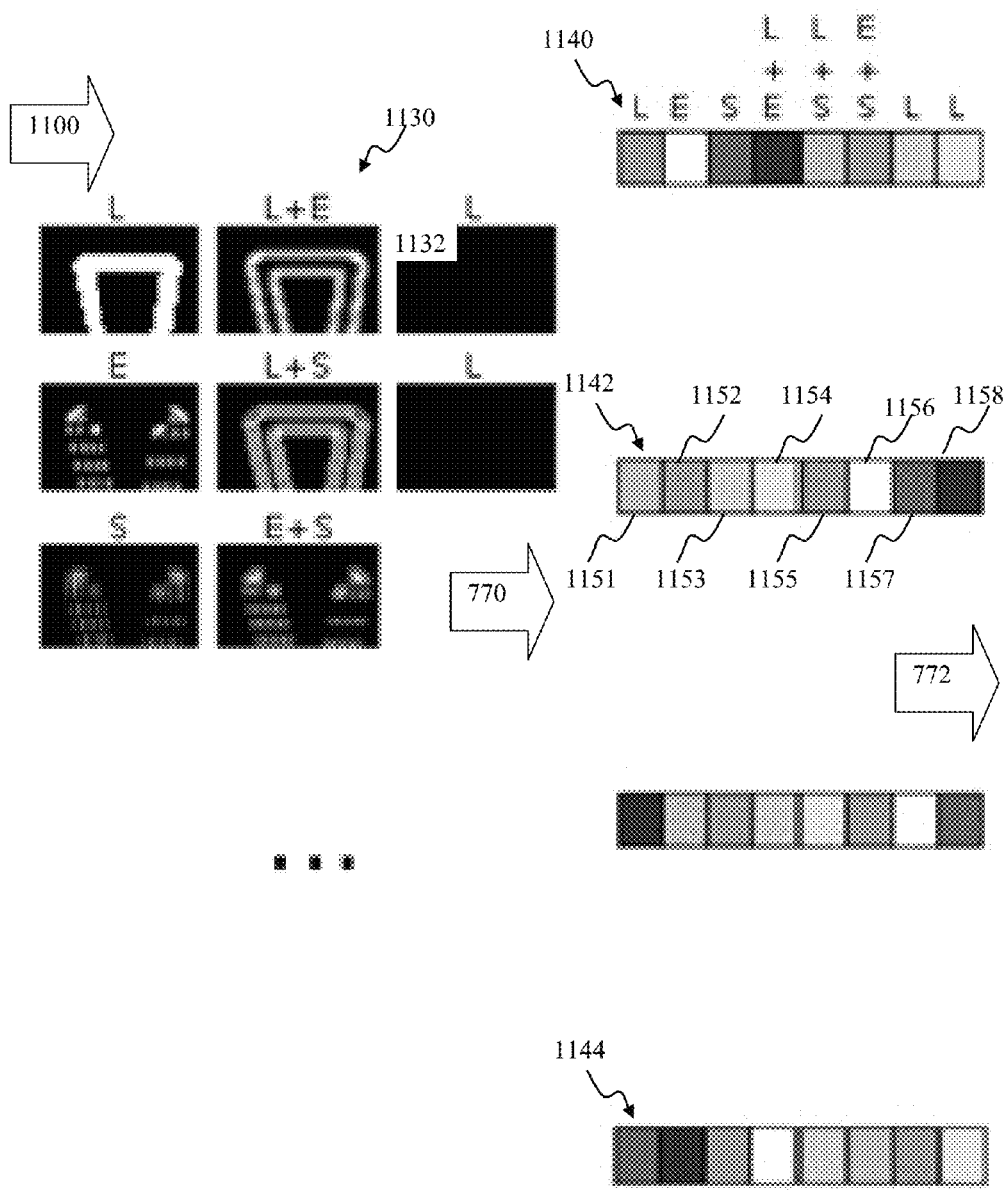

Output 772 of the operation 770 in FIG. 7D may comprise a plurality of elements (e.g., rows 1140, 1042, 1144 in FIG. 11B). Individual elements of a given row (e.g., 1142) may correspond to partitions associated with the following mask operations: 1151, 1157, 1158 may correspond to data of images 1110, 1122, 1124; element 1152 may correspond to data of image 1112, element 1153 may correspond to data of image 1114, element 1154 may correspond to data of image 1116, element 1155 may correspond to data of image 1118, element 1156 may correspond to data of images 1120. The output 772 may be provided to a learning component (e.g., the output 558 for the component 560 in FIG. 5).

Figure 7E:
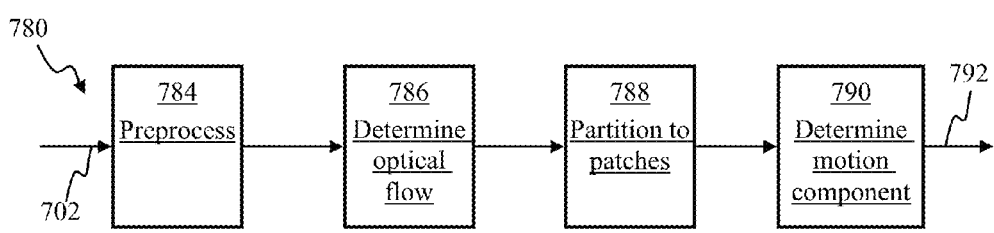
FIG. 7E is a block diagram illustrating operation of a feature detection apparatus comprising feature determination based on motion information, in accordance with one or more implementations.

FIG. 7E illustrates operation of a feature detection apparatus comprising feature determination based on motion information, in accordance with one or more implementations.

At operation 784 of the feature detector 780, input 702 may be pre-processed. The input 702 may comprise a variety of sensor data e.g., such as described above with respect to FIGS. 1 and/or 7A. In one or more implementations wherein the input 702 may comprise one or more RGB images comprising a two-dimensional matrix of red/green/blue pixel values refreshed at a 25 Hz frame rate, the preprocessing operation 744 may comprise image down-sampling (e.g., to 80×60 pixels in some implementations), and/or accumulation (e.g., via buffering) a plurality of images.

At operation 786 optical flow may be determined. In one or more implementations, the optical flow determination may be configured based on analysis of consecutive images (e.g., images 1202, 1204 in FIG. 12A), e.g., as described in U.S. patent application Ser. No. 13/689,717 entitled "APPARATUS AND METHODS FOR OBJECT DETECTION VIA OPTICAL FLOW CANCELLATION", filed Nov. 29, 2012 and/or U.S. patent application Ser. No. 13/689,712 entitled "APPARATUS AND METHODS FOR ENCODING VECTOR INTO PULSE-CODE OUTPUT", filed Nov. 29, 2012, each of the foregoing being incorporated herein by reference in its entirety.

Figure 12A:
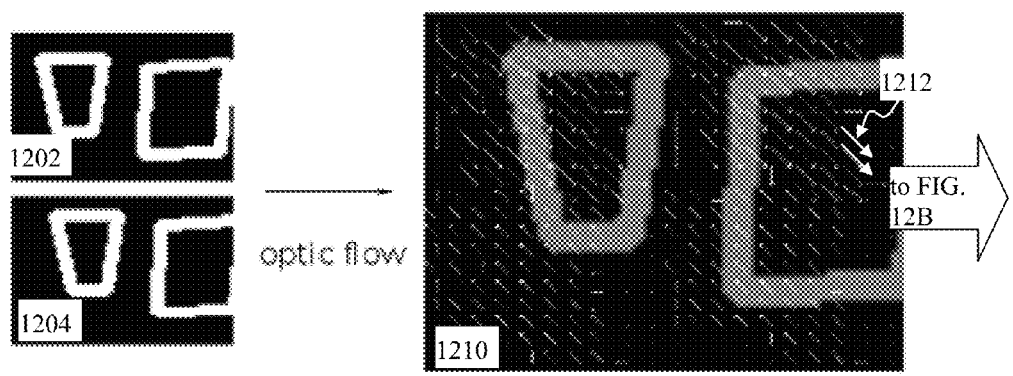
FIGS. 12A-12B depict data related to feature detection based on the optical flow approach, in accordance with one or more implementations.

Output of the optical flow determination process may comprise a spatial (e.g., 1210 in FIG. 12A) map comprising plurality of vectors (e.g., 1212 in FIG. 12A). Individual vectors (e.g., 1212 in FIG. 12A) may convey information associated with a discrepancy between pixels of one image (e.g., 1204) with respect to pixels of another image (e.g., 1202 in FIG. 12A). In some implementations, the vector map 1210 may comprise a pattern of apparent motion of objects, surfaces, and edges in a visual scene caused by the relative motion between the camera (e.g., 116 in FIG. 1) and the scene.

At operation 788 the output of the optical flow determination process may be partitioned. In some implementations, the partitioning operation 788 may comprise partitioning individual images (e.g., 1210 in FIG. 12A) into 20×20 pixel portions (e.g., the partition 1220 in FIG. 12B) without an overlap. In one or more implementations, the partitioning operation may comprise an overlap between adjacent portions (e.g., 50% of size).

At operation 790 motion characteristic may be determined for individual partitions (e.g., 1220 in FIG. 12B) determined at operation 788. In some implementations, the operation 790 may comprise a sparse transformation (e.g., determining a component-wise quantized median, and/or other transformation operation). In one or more implementations, the motion characteristic may comprise determining predominant motion direction using a statistical characteristic (e.g., a median) of x and y components of the flow vectors for a given partition (e.g., 1220). It will be appreciated by those skilled in the arts that various other statistical parameters may be used, e.g., a percentile, a mean. The motion x-y components for a given partition may be quantized into a plurality of direction bins (e.g., 5 in the implementation shown in FIGS. 12A-12B).

Figure 12B:
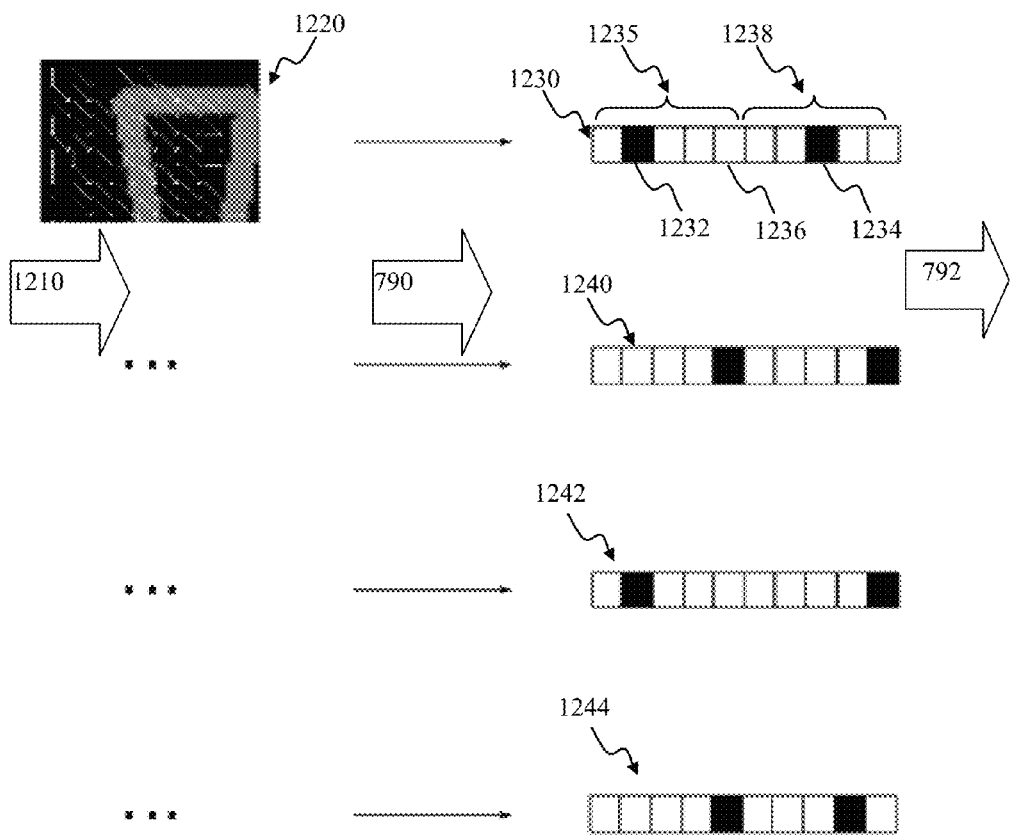

FIG. 12B illustrates the operation 790 of FIG. 7E. Individual rows (e.g., 1230, 1240, 1244, 1246 in FIG. 12B) may correspond to individual partitions (e.g., 1220 of FIG. 12A). A given row may comprise a portion (e.g., 1235 of row 1230) configured to convey information related to flow vector x-component; and a portion (e.g., 1238 of row 1230) configured to convey information related to flow vector y-component. Solid rectangles (e.g., 1232, 1234) in FIG. 12B denote bins corresponding to the x and y (respectively) components of the motion determined at operation 790 (e.g., median motion vector components); open rectangles (e.g., 1236) in FIG. 10B denote discarded bins (e.g., assigned a NaN, a zero and/or other value (e.g., "discard tag") indicating to a processing device that such tagged data may not be used for training).

Output 792 in FIG. 7E (e.g., rows 1230, 1240, 1242, 1244 in FIG. 12B) of the operation 790 may comprise one or more features (e.g., feature motion). The output 792 may be provided to a learning component (e.g., the output 558 for the component 560 in FIG. 5).

In some implementations, input into the predictor may comprise features obtained using two or more FD (e.g., 552, 554, 556, 557 in FIG. 5). Values provided by individual FD process may be characterized by different range and/or mean values. A learning process configured based on a gradient approach, a zero mean unit variance input may provide more robust operation compared to inputs that have different mean and/or variance values.

In some implementations, the feature detection output operations (e.g., output 558 determination by component 550 in FIG. 5 and/or operations of components 710, 730, 750, 770 in FIGS. 7A-7B) may comprise normalization and/or scaling operations applied to the features determined by a respective process.

The feature normalization processing may comprise level adjustment (e.g., mean removal), range scaling (e.g., variance normalization), and/or other operations. The mean value for a given population of features may be obtained using an online running mean determination operation as follows. For a given feature of the plurality of features of the input 558 two accumulators may be provided. In some implementations, the accumulators may comprise memory locations configured to store a floating point value (e.g., 32 bit, 64 bit, and/or other bit length). One accumulator may be configured to accumulate a sum of values of the feature; another accumulator may be configured to accumulate square of the feature values. If a feature is updated (e.g., based on processing another input frame) the accumulator may be updated. A counter may be used to store information related to the number of accumulated feature values (frames). Running mean feature M value may be determined based on dividing contents of the value accumulator by the number of accumulated values; an estimate of the feature variance value may be determined based on dividing contents of the square value accumulator by the number of accumulated values and subtracting square of the running mean value M.

Table 9 and Table 10 present data related to feature statistics associated with the feature detection process 760 described above with respect to FIG. 7D. Data in Table 9 were obtained by the Assignee thereof while operating sensor apparatus indoors. Data in Table 10 were obtained by the Assignee thereof while operating sensor apparatus outdoors. Data presented in Table 9 and Table 10 correspond to features being determined for 2000 frames.

Comparing data in Table 9 and Table 10 reveals differences in the average and standard deviation values of features obtained with the same mask (e.g., L+E) in different environments. Feature normalizing may improve performance of the predictor (e.g., the learning component 560 in FIG. 5).

TABLE 9

| | Mask Type | | | | | | | |
|---|---|---|---|---|---|---|---|---|
| | Level | Edge | Spot | L + E | L + S | W + S | L | L |
| average | 120 | 130 | 129 | 3.6 | 2.2 | 9.2 | 5.8 | 2.8 |

TABLE 9-continued

| | Mask Type | | | | | | | |
|---|---|---|---|---|---|---|---|---|
| | Level | Edge | Spot | L + E | L + S | W + S | L | L |
| std dev: | 47 | 6.1 | 5.3 | 2.5 | 1.5 | 4.7 | 3.3 | 1.9 |

TABLE 10

| | Mask Type | | | | | | | |
|---|---|---|---|---|---|---|---|---|
| | Level | Edge | Spot | L + E | L + S | W + S | L | L |
| average: | 128 | 127 | 125 | 2.0 | 1.9 | 4.8 | 3.4 | 1.9 |
| std dev: | 24 | 1.5 | 5.2 | 1.1 | 1.0 | 1.8 | 1.4 | 1.0 |

Figure 13:
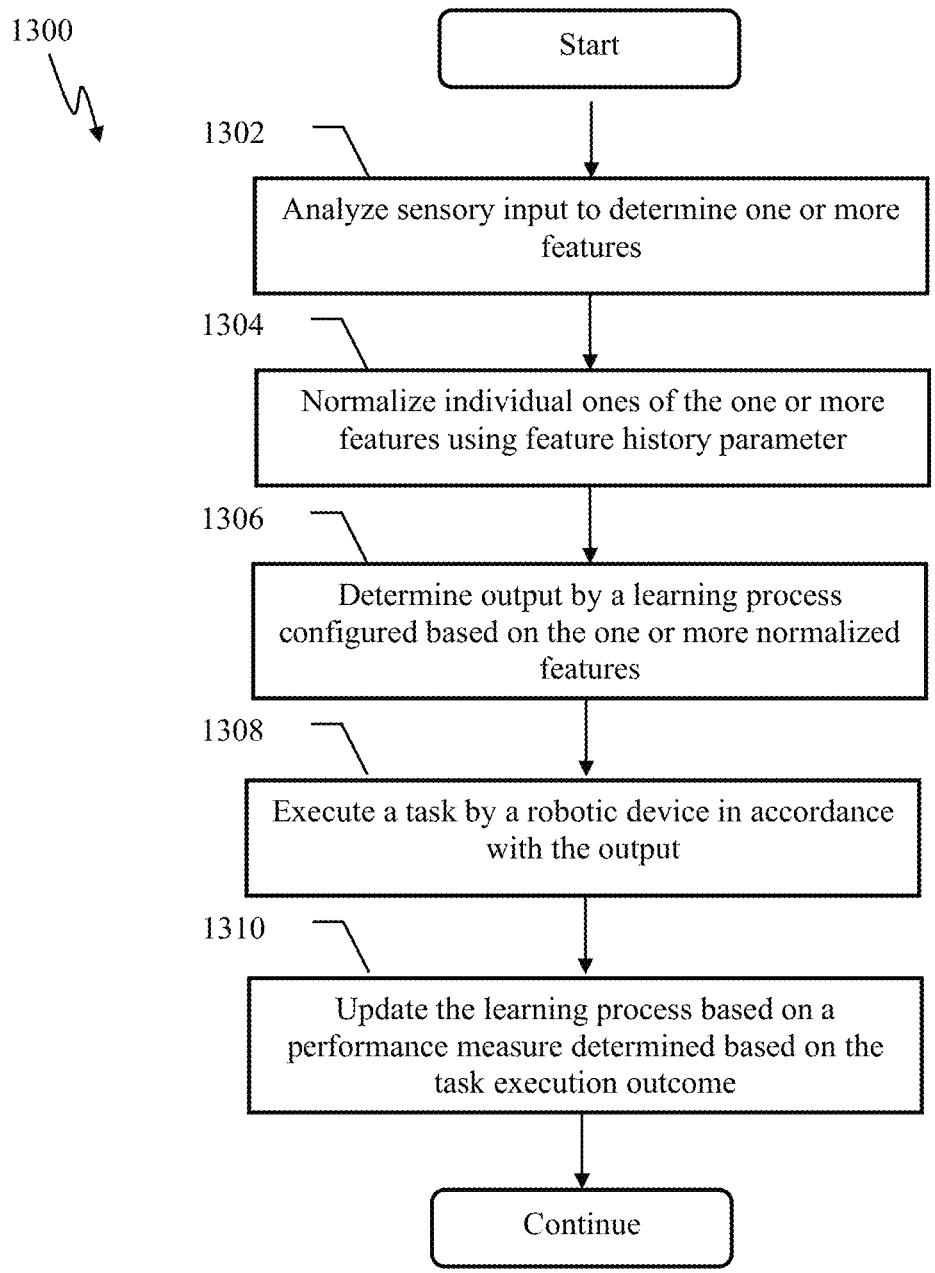
FIG. 13 is a logical flow diagram illustrating operation of a controller comprising a feature learning apparatus, in accordance with one or more implementations.
Figure 14:
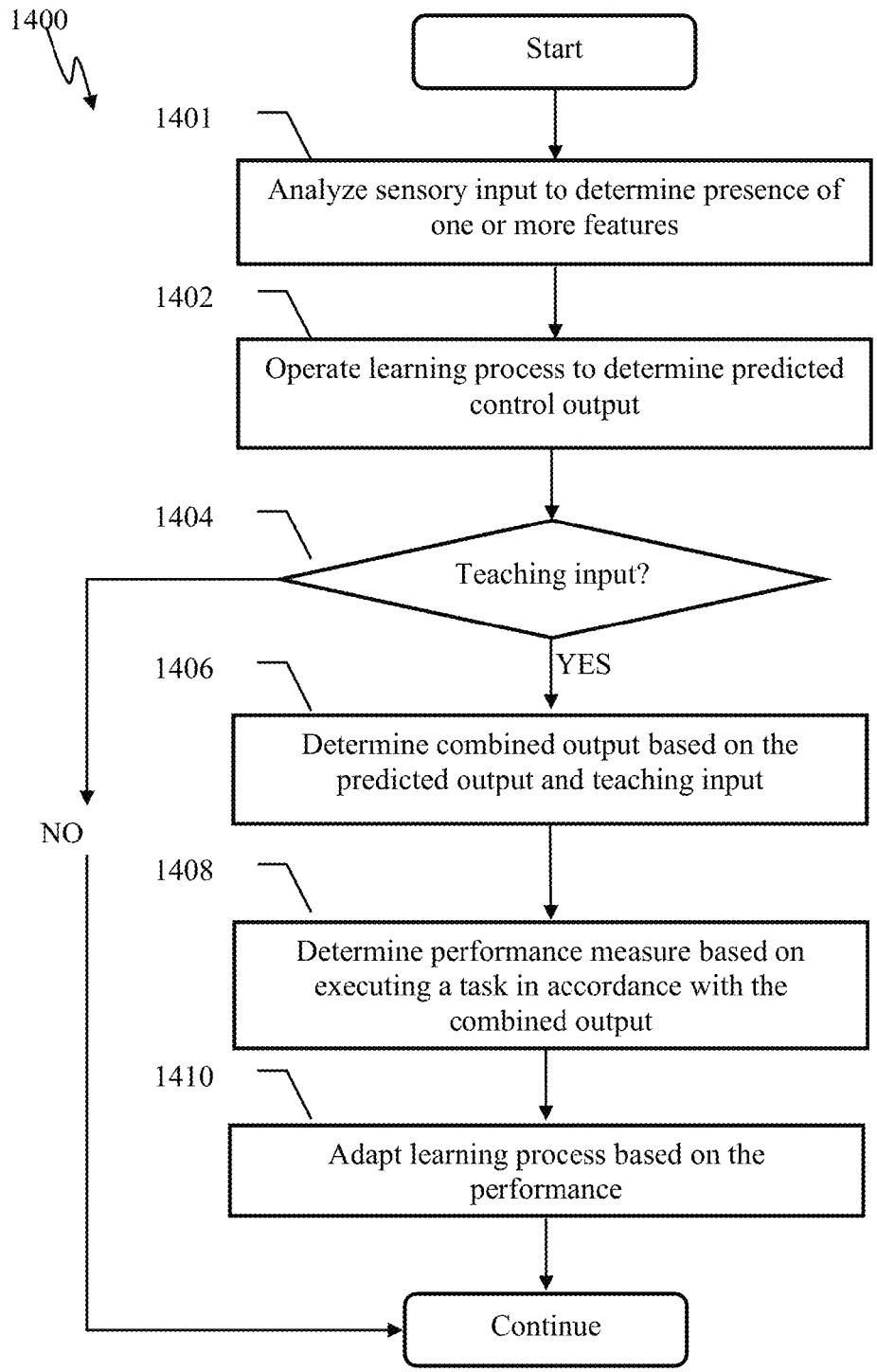
FIG. 14 is a logical flow diagram illustrating operation of a learning controller, in accordance with one or more implementations.

FIGS. 13-14 illustrate methods of training and/or operating a learning controller apparatus (comprising feature learning of the disclosure) in accordance with one or more implementations. The operations of methods 1300, 1400 presented below are intended to be illustrative. In some implementations, methods 1300, 1400 may be accomplished with one or more additional operations not described, and/or without one or more of the operations discussed. Additionally, the order in which the operations of methods 1300, 1400 are illustrated in FIGS. 13-14 described below is not intended to be limiting.

Methods 1300, 1400 may be implemented in one or more processing devices (e.g., a digital processor, an analog processor, a digital circuit designed to process information, an analog circuit designed to process information, a state machine, and/or other mechanism for electronically processing information and/or configured to execute computer program modules stored as computer readable instructions). The one or more processing devices may include one or more devices executing some or all of the operations of methods 1300, 1400 in response to instructions stored electronically on a non-transitory electronic storage medium. The one or more processing devices may include one or more devices configured through hardware, firmware, and/or software to be specifically designed for execution of one or more of the operations of methods 1300, 1400. The operations of methods 1300, 1400 may be implemented by a learning controller apparatus (e.g., 400, 440 in FIGS. 4A-5B) configured to control a robotic device (e.g., 110 in FIG. 1).

FIG. 13 illustrates operation of a controller comprising a feature learning apparatus, in accordance with one or more implementations.

At operation 1302 of method 1300, sensory input may be analyzed in order to determine one or more features. In one or more implementations, the sensory input may comprise visual, audio, and/or other input (e.g., radio frequency waves) e.g., the input 402 described above with respect to FIGS. 4A-4B, 502 of FIGS. 5, and/or 702 7A-7E. The analysis may comprise one or more operations described with respect to FIGS. 5, 7A-7E. Feature detection output may comprise a vector (or a matrix) comprising one or more features. In one or more implementations, individual components of the feature output may comprise one or more integer or floating point values characterizing the input, e.g., the presence or absence of an edge, corner, shape, texture, color, object, at particular locations in the image, patches of the image, or in the image as a whole; properties of the mentioned features, such as size, orientation, intensity, predominance with respect to the surround, of an edge, corner, shape, texture, color, object; the position of one of the features in the image or the relative position of two or more of the above mentioned features; changes in features across consecutive frames—changes in position (optic flow), intensity, size, orientation; the pitch, intensity, spectral energy in specific bands, formants of sounds, the temporal changes thereof, and/or practically any characteristic of the input.

At operation 1304 one or more features obtained based on the operation 1300 may be normalized using feature history parameter. In some implementations the feature history parameter may comprise a statistical parameter (e.g., mean, variance, standard deviation) and/or other parameter. Normalization may comprise transformation of the feature ensemble into a zero mean unit variance set of values.

At operation 1306 an output may be determined by a learning process configured based on the one or more normalized features. In one or more implementations, the output may comprise output 418 of a predictor 410 in FIGS. 4A-4B, output 420, 466 of the combiner 414, 464 in FIGS. 4A-4B, output 478 of the adapter 476 in FIG. 4B; and/or output 568 of FIG. 5.

At operation 1308 a task may be executed by a robotic device in accordance with the output of the learning process. In one or more implementations, the task may comprise a n obstacle avoidance, target approach tasks, (e.g., 206, 216 in FIG. 2) and/or tasks described above with respect to FIG. 3.

At operation 1310 the learning process may be updated based on a performance measure determined based on the task execution outcome. In one or more implementations, the performance measure may comprise a discrepancy between actual trajectory of the robotic device during task execution and a target trajectory (e.g., the discrepancy 338 between trajectory 334, 332 and 330 in FIG. 3).

FIG. 14 illustrates operation of a learning controller, in accordance with one or more implementations.

At operation 1401, of method 1400, illustrated in FIG. 14, sensory input may be analyzed. In one or more implementations, the sensory input analysis may be configured to determine presence of one or more features in the sensory input. The input may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active pixel sensor (APS), and/or other sensor types. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK (cyan, magenta, yellow, and key), HSV (hue, saturation, value), HSL (hue, saturation, lightness), grayscale, and/or other representations) and/or moving picture formats (e.g., video) are equally useful with the present disclosure. In one or more implementations, the sensory aspects may include an object being detected in the input, a location of the object, an object characteristic (color/shape), a characteristic of robot's movements (e.g., speed along the trajectory portion 204 in FIG. 2), a characteristic of an environment (e.g., an apparent motion of a wall and/or other surroundings, physical characteristics of an "approach" (e.g., incline, texture, etc.), and/or other environmental characteristics) responsive to the movement.

At operation 1402 learning process may be operated to determine predicted control output. In some implementations, the predicted output may be determined based a previously determined association between occurrence of a given feature (e.g., an obstacle 208 in FIG. 2) and a corresponding action (e.g., turn 206) of the robotic device.

At operation 1404, a determination may be made as to whether a teaching input may be present. In some implementations, the teaching input may comprise an external (with respect to the learning process) input provided by a trainer (e.g., the input 452 in FIG. 4B). The teaching input may be configured to aid generation of a control output by the network in order to cause a robotic device (e.g., 110 in FIG. 1) to execute a target task. In some implementations, the trainer may comprise a user and/or a computerized agent that had been trained to operate the robotic device.

Responsive to a determination at operation 1404 that the teaching input is present, the method 1400 may proceed to operation 1406 wherein a combined output may be determined based on the predicted control output and the teaching input. In one or more implementations, the combined output may be determined using operations described above with respect to combiner component 414 of FIG. 4A and/or combiner component 464 of FIG. 4B.

At operation 1408, a performance may be determined based on execution of a task in accordance with the combined output. In one or more implementations, the performance may comprise a cost measure obtained using any applicable methodology (e.g., such as described in co-owned U.S. patent application Ser. No. 13/487,499 entitled "STOCHASTIC APPARATUS AND METHODS FOR IMPLEMENTING GENERALIZED LEARNING RULES", filed Jun. 4, 2012 incorporated supra) and/or described above with respect to performance determination component 570 of FIG. 5. In some implementations, the performance may comprise determination of a discrepancy between the predicted output and the combined output, using, e.g., a mean-squared-error, a cross-entropy, and/or negative-log-likelihood operations.

At operation 1410, learning process may be adapted based on the performance measure. In one or more implementations, the learning process adaptation may be configured based on online error back propagation methodology, e.g., described in co-owned U.S. patent application Ser. No. 14/054,366 entitled "APPARATUS AND METHODS FOR BACKWARD PROPAGATION OF ERRORS IN A SPIKING NEURON NETWORK", filed Oct. 15, 2013, and/or U.S. patent application Ser. No. 13/487,499 entitled "STOCHASTIC APPARATUS AND METHODS FOR IMPLEMENTING GENERALIZED LEARNING RULES", filed Jun. 4, 2012, incorporated supra.

Use of feature detection and/or online learning methodology described herein may enable training of robotic devices to operate autonomously. Using an online supervised learning process, a trainer may be capable of providing teaching input to the robotic device in real time during operation of the device. Learning process may be adapted based on a training signal configured based on the (external) teaching input and the (internally) predicted control signal.

Methodology of the disclosure may enable training of a variety of robotic devices e.g., robotic vehicles, robotic toys, and/or other devices. The online training approach may enable a user to train the controller to detect a variety of objects without object pre-selection and/or network pre-wiring and/or without requiring a trainer to record training dataset and analyze data offline. These improvements may be leveraged for constructing autonomous robotic vehicles characterized by a lower cost and/or increased autonomy and/or enable robotic devices to operate in more complex requirements (e.g., tracking multiple targets), navigate at higher speeds, and/or achieve higher performance (e.g., as characterized by a number of collisions, run time and/or other parameter).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A method of determining a motor control signal for a robot based on an analysis of a sensor input, the method comprising:
   analyzing the sensor input based on a first transformation process applied based on a presence of one or more first features present in the sensor input with a first characteristic;
   analyzing the sensor input based on a second transformation process applied based on a presence of one or more second features present in the sensor input with a second characteristic, the second characteristic being different from the first characteristic;
   determining a feature history comprising a plurality of features determined based on at least the acts of analyzing the sensor input based on the first transformation process over a first time interval and analyzing the sensor input based on the second transformation process over a second time interval;
   normalizing each of the plurality of features using a statistical parameter determined from the feature history;
   providing a plurality of the normalized features to a classification process for detecting at least one relevant feature among the plurality of the normalized features, the at least one relevant feature being characterized by a relevancy parameter that is larger than a predetermined threshold;
   selecting from a plurality of control signals a motor control signal associated with the at least one relevant feature; and
   executing the selected motor control signal, thereby causing a target task to be performed by the robot;
   wherein the act of selecting the motor control signal is effectuated based on a prior contemporaneous occurrence of the motor control signal and the at least one relevant feature.

2. The method of claim 1, wherein the relevancy parameter larger than a predetermined threshold is generated according to one or more of a correlation, a probability, and a distance measure between an occurrence of the plurality of features and an occurrence of the motor control signal.

3. The method of claim 2, wherein:
   the act of analyzing the sensor input with the first characteristic comprises analyzing: a feature color, a feature texture, a feature edge orientation, and a feature type; and
   the act of analyzing the sensor input with the second characteristic comprises analyzing a feature motion.

4. The method of claim 1, wherein:
   the first transformation process comprises a sparsification operation comprising selecting one or more first features from a plurality of first outputs produced by the first transformation process based on the first characteristic; and
   the sparsification operation further comprises reducing a number of data elements by a factor of at least four.

5. The method of claim 4, wherein the first characteristic comprises a statistical parameter further determined based on the plurality of first outputs of the first transformation process.

6. An apparatus configured to determine a motor control signal for a robot based on an analysis of an input signal, the apparatus comprising:
   a processor; and
   a non-transitory computer-readable medium configured to store at least one computer program thereon, the computer program comprising a plurality of instructions configured to, when executed by the processor, cause the apparatus to:
      analyze the input signal based on a first transformation process applied based on a presence of at least one first feature from the input signal with a first characteristic;
      analyze the input signal based on a second transformation process applied based on a presence of at least one second feature from the input signal with a second characteristic, the second characteristic being different from the first characteristic;
      determine a plurality of features based on the analysis of the input signal based on the first transformation process over a first time interval and the analysis of the input signal based on the second transformation process over a second time interval;
      normalize each of the plurality of features using a statistical parameter derived from the plurality of features;
      provide a plurality of normalized features to a classification process configured to detect at least one relevant feature among the plurality of normalized features, the at least one relevant feature comprising a relevance parameter that exceeds a predetermined threshold;
      select from a plurality of control signals a motor control signal associated with the at least one relevant feature with the relevance parameter that exceeds the predetermined threshold; and
      apply the selected motor control signal to the robot, thereby causing the robot to execute a target task;

wherein the selection of the motor control signal is based on a prior simultaneous occurrence of the motor control signal and the at least one relevant feature.

7. The apparatus of claim 6, further comprising a history buffer configured to store one or more of the plurality of features.

8. The apparatus of claim 6, wherein the relevance parameter is generated by one or more of: a correlation, a probability, and a distance measure between an occurrence of the plurality of features and an occurrence of the motor control signal.

9. The apparatus of claim 8, wherein:
the first characteristic is selected from a group consisting of: a feature color, a feature texture, a feature edge orientation, and a feature type; and
the second characteristic comprises a feature motion.

10. The apparatus of claim 6, wherein:
the first transformation process comprises a sparsification operation configured to select one or more first features from a plurality of first outputs produced by the first transformation process based on the first characteristic; and
the sparsification operation is further configured to reduce a number of data elements by a factor of at least four.

11. The apparatus of claim 10, wherein the first characteristic comprises a statistical parameter further determined based on the plurality of first outputs of the first transformation process.

12. The apparatus of claim 11, wherein the statistical parameter comprises one or more of: a mean, a variance, a percentile, and a standard deviation.

13. A system for determining a motor control signal for a robotic apparatus based on an analysis of an external input, the system comprising:
a sensor configured to receive the external input;
a non-transitory computer-readable memory configured to store a plurality of computer instructions; and
at least one processing component configured to cause the plurality of computer instructions to, when executed:
analyze the external input via a first transformation process applied based on a presence of a first set of features from the input signal with a first characteristic;
analyze the external input via a second transformation process applied based on a presence of a second set of features from the external input with a second characteristic;
determine a plurality of features based on the analysis of the external input via the first transformation process over a first period of time and the analysis of the external input via the second transformation process over a second period of time;
normalize each of the plurality of features using a statistical parameter determined from the plurality of features;
provide a plurality of normalized features to a classification process configured to detect one or more relevant features among the plurality of normalized features, the one or more relevant features comprising a relevance value that exceeds a threshold; and
select from a plurality of control signals a motor control signal associated with the one or more relevant features with the relevance value that exceeds the threshold;
wherein the selection of the motor control signal is based on a previous concurrent occurrence of the motor control signal and the one or more relevant features; and
wherein the robotic apparatus is configured to execute a task based on the selection of the motor control signal.

14. The system of claim 13, wherein:
the external input comprises a training control indication;
the at least one processing component is further configured to operate a combiner process configured to:
produce a combined control indication based at least on the training control indication; and
provide the combined control indication;
wherein the motor control signal is determined at least in part on the combined control indication.

15. The system of claim 14, wherein:
the combiner process comprises an override transfer function; and
a non-zero value of the training control indication is configured to cause a determination of the combined control indication.

16. The system of claim 13, wherein a relevance of the one or more relevant features comprises a parameter generated from one or more of: a correlation, a probability, and a distance measure between the concurrent occurrence of the motor control signal and the one or more relevant features.

17. The system of claim 13, wherein:
the first characteristic is selected from a group consisting of: a feature color, a feature texture, a feature edge orientation, and a feature type; and
the second characteristic characterizes a feature motion.

18. The system of claim 13, wherein:
the first transformation process comprises a sparsification operation comprising selecting one or more first features from a plurality of first outputs produced by the first transformation process based on the first characteristic; and
the sparsification operation is further configured to reduce a number of data elements by a factor of at least four.

19. The system of claim 13, wherein the first characteristic comprises a statistical parameter further determined based on the plurality of first outputs of the first transformation process.

* * * * *